US006591271B1

(12) United States Patent (10) Patent No.: US 6,591,271 B1
Ceri et al. (45) Date of Patent: Jul. 8, 2003

(54) MODEL FOR THE DEFINITION OF WORLD WIDE WEB SITES AND METHOD FOR THEIR DESIGN AND VERIFICATION

(75) Inventors: Stefano Ceri, Milan (IT); Piero Fraternali, Erba (IT)

(73) Assignee: Politecnico di Milano, Milan (IT)

(*) Notice: Subject to any disclaimer, the term of this patent is extended or adjusted under 35 U.S.C. 154(b) by 0 days.

(21) Appl. No.: 09/466,894

(22) Filed: Dec. 20, 1999

(30) Foreign Application Priority Data

Jul. 13, 1999 (IT) .......................................... MI99A1534

(51) Int. Cl.[7] .............................................. G06F 17/30
(52) U.S. Cl. ........................................................ 707/102
(58) Field of Search .............................. 707/10, 9, 101; 705/27; 714/25; 709/100

(56) References Cited

U.S. PATENT DOCUMENTS

| 5,736,664 A | * | 4/1998 | Ito et al. ........................ 84/634 |
| 5,812,134 A | * | 9/1998 | Pooser et al. ................ 345/848 |
| 5,974,444 A | * | 10/1999 | Konrad ........................ 709/203 |
| 6,008,847 A | * | 12/1999 | Bauchspies ............ 375/240.01 |
| 6,463,432 B1 | * | 10/2002 | Murakawa ...................... 707/5 |

FOREIGN PATENT DOCUMENTS

WO 98/49617 11/1998

OTHER PUBLICATIONS

Fraternali et al, "A Conceptual Model and a Tool Environment for Developing More Scalable Dynamic, and Customizable Web Applications", Advances in Database Technology—EDBT '98, 6th Int'l. Conference on Extending Database Technology Proceedings Valencia, Spain, Online! Mar. 23–27, 1998, pp. 421–435.

Ceri et al, "Design Principles for Data–Intensive Web Sites", SIGMOD RECORD, Online!, vol. 28, No. 1, Mar. 1999, pp. 84–89.

Atzeni et al, "Design and Maintenance of Data–Intensive Web Sites", Advances in Database Technology—EDBT '98. 7th Int'l. Conference on Extending Database Technology Proceedings, Valencia, Spain, Mar. 23–27, 1998, pp. 436–450.

Shah et al, "Creating High Performance Web Applications Using Tcl, Display Templates, XML, and Database Content", Proceedings of the Sixth Annual TCL/TK Conference, Proceedings of 6th USENIX Annual TLC/TK, San Diego, CA, USA, Online!, Sep. 18–14, 1998, pp. 121–130.

* cited by examiner

Primary Examiner—Safet Metjahic
Assistant Examiner—Sana Al-Hashemi
(74) Attorney, Agent, or Firm—Nixon & Vanderhye, P.C.

(57) ABSTRACT

The present invention describes a model, named WebML (Web Modelling Language), and method for the specification, design, and verification of World Wide Web (Web) sites. WebML allows the designer to build an abstract specification of the Web site, which can be used to construct a concrete implementation of the specified Web site. The WebML model includes a structural sub-model, a composition sub-model and a navigation sub-model. The structural sub-model describes the schema of the content to be published in the Web site, using an Entity-Relationship model. The composition sub-model includes several types of logical pages, which specify alternative ways in which elements of the structural sub-model can be published in a Web page. The navigation sub-model describes how logical pages can be linked to enable a user to navigate from a logical page to another logical page; it also describes how logical pages are clustered in physical pages, and how physical pages are clustered into site views, which are views of the Web site suited to a given user group or access device.

15 Claims, 20 Drawing Sheets

MODEL FOR THE DEFINITION OF WORLD WIDE WEB SITES AND METHOD FOR THEIR DESIGN AND VERIFICATION

FIELD OF THE INVENTION

The present invention refers to a model, named Web Modeling Language (WebML), which gives support to the activities of specification, design, verification, and implementation of applications for the World Wide Web.

BACKGROUND AND SUMMARY OF THE INVENTION

The Web is one of the most promising platforms for the development of computer applications of various kinds.

The Web hosts a large variety of applications, among which the most important is electronic commerce.

Especially the applications dedicated to the purchase of goods and services are expected to have a significant development and to become widespread thanks to the use of the Web by means of new access devices such as the digital television and the cellular telephone. Tools for the development of Web applications are very important because they will influence the capability of companies of offering new Web applications.

The premise for the development of tools for supporting the development of artifacts and applications is the availability of suitable models for the specification of the requirements of the applications under development.

As it is well known, the models for the specification of Web sites are an evolution of the models for the specification of data and of the models for the specification of hypertexts, where an hypertext denotes a nonlinear text whose reading sequence is not predefined but rather follows paths defined by the user.

A well known conceptual model for data specification is the Entity-Relationship model (P. Chen, "The entity-relationship model: towards a unified view of data", ACM TODS, 1976, volume 1, number 1, pages 9–36), which introduces the notions of entity, attribute, and relationship, for describing the properties of persistent data managed by a computer application. The Entity-Relationship model does not deal with constructs for the description of features related to the publishing of data as Web pages.

A model proposed for the description of hypertexts is the Dexter model (F. G. Halasz and M. Schwartz, "The Dexter hypertext reference model", Communications of the ACM, 1994, volume 37, number 2, pages 30–39), which represents an hypertext as a set of nodes connected by links. The Dexter model is extremely simple and does not permit the separate description of the data structure, the navigation, the composition of nodes, and their presentation.

A further model explicitly proposed for the design of hypertext and multimedia applications is HDM (Hypermedia Design Model) (F. Garzotto, L. Mainetti, P. Paolini, "Hypermedia Design, Analysis, and Evaluation Issues", Communications of the ACM, 1995, Volume 38, Number 8, pages 74–86). This model supports the separation of the data description from the navigation description, i.e., the ability of moving from one page to another page, but it does not support the specification of the composition of pages and of the presentation criteria. Moreover, the supported navigation capabilities are limited a-priori and cannot be extended by the designer.

A further model is RMM (T. Isakowitz, E. Stohr, P. Balasubramanian: "RMM: A Methodology for Structured Hypermedia Design", Communications of the ACM, 1995, Volume 38, Number 8, pages 34–44), which consists of an evolution of the HDM model and of the Entity-Relationship Model. This model is appropriate for the definition of hypermedia applications and Web sites. Also RMM, as HDM, does not support the separated definition of navigation, presentation, and composition, although it offers a limited number, defined a-priori, of possible navigation constructs. Another evolution of HDM is presented in OOHDM (Object-Oriented Hypermedia Design Method) (D. Schwabe, G. Rossi, S. Barbosa, "Systematic Hypermedia Design with OOHDM", Proc. ACM Int. Conf. on Hypertext, 1996, Washington, USA, pp.116–128), which is also appropriate for the definition of hypermedia applications but adopts a limited number, defined a-priori, of possible navigation constructs and requires complex object-oriented modeling for defining the semantics of more powerful navigation mechanisms.

Another model is Araneus (P. Atzeni, G. Mecca, P. Merialdo, "To Weave the Web", Proc. $23^{rd}$ Conference on Very Large Data Bases, 1997, Athens, Greece, pages 206–215 and P. Atzeni, G. Mecca, P. Merialdo: "Design and Maintenance of Data-Intensive Web Sites". Proc. EDBT, 1998, Valencia, Spain, 436–450"), which is a methodological proposal for the development of Web sites based on RMM.

Araneus contains a language for the conceptual specification of navigation, called Navigation Conceptual Model (NCM), which is a simplified version of RMM. This model supports the specification of a limited set of possible navigation paths. In addition, Araneus contains a logical model for the definition of the pages of Web sites, named Araneus Data Model (ADM). Such logical model permits the description of a Web page as a set of attributes, lists, navigational anchors, and fields for data insertion. Araneus has the limitation of not supporting the definition at a conceptual level of the presentation aspects of Web pages.

In view of the described state of the art, the object of the present invention is to provide a conceptual model for the specification, design, verification and implementation of Web sites in which page composition and navigation constructs can be arbitrarily modeled by the designer instead of being selected from a predefined set.

This object is obtained by means of a model for the design, verification and development of World-Wide-Web (Web) applications including a structural sub-model, a composition sub-model and a navigation sub-model.

The composition sub-model enables the definition of the elementary pages that compose an application for the Web starting from the structural model.

The navigation sub-model enables the definition of the way of accessing the pages of the Web site from outside, and of the way of moving from a page to another page within the site.

Thanks to the present invention it is possible to define in a formal way Web sites with an arbitrary data structure. It is possible to describe page configurations starting from the aforementioned data structure. It is then possible to introduce navigation paths between pages and define collections of objects for accessing the pages from the outside the Web site. It is also possible to define a different global view of the Web site for each group of homogeneous users or also for each individual user.

The features and the advantages of the present invention will result evident from the subsequent detailed description of a form of practical realization, which is described as a non-restrictive example in the enclosed figures.

DETAILED DESCRIPTION

Figure 1:
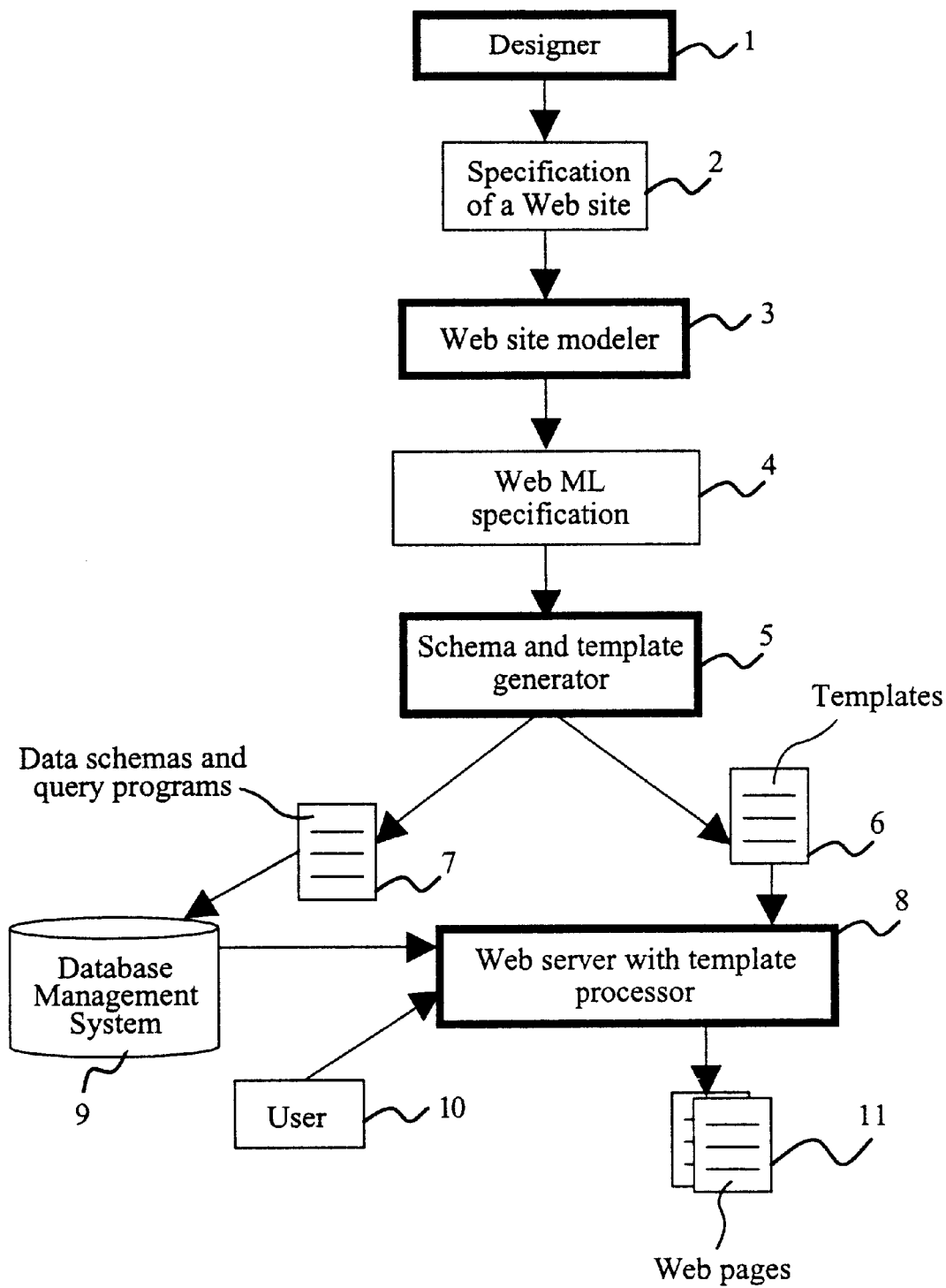
FIG. 1 shows the architecture of the computer-based tools for the development of a Web site.

In order to illustrate the present invention an application in the field of electronic commerce is used by way of example. This application requires the building of a Web site for the publication of the catalog of goods of a company.

The first type of data used by such application concerns articles belonging to a catalog, which are described by a name, a code, a descriptive text, and the price. Such articles have in addition a set of large images that show them in different settings.

The second type of data concerns special offers, i.e. product combinations sold at a special price. Every combination has a name, a code, a descriptive image, and a price.

The site also describes the points of sale, characterized by an address, a photograph, a map showing their placement, and an electronic e-mail address where it is possible to send messages in order to have information.

For a better understanding of the following description, we give here a glossary of the definitions, which make the interpretation of used terms unambiguous.

ANCHOR: a portion of text or an image, which is associated to another text by means of a hypertext link.

ATTRIBUTE: a construct that is used in the specification of computerized systems to describe a property of an object.

COLLECTION: a WebML construct for the specification of groups of objects that in a given application should be grouped together.

COMPONENT: a construct which is used in the specification of information systems to describe an object which is part of a given ENTITY and whose existence is subject to the existence of the ENTITY that encloses it.

DATA PAGE: a WebML construct that is used for the specification of a set of data relative to an ENTITY or to a COMPONENT to be published in a Web site.

ENTITY RELATIONSHIP MODEL: standard formalism for the specification of data of information systems based on the concepts of ENTITY, RELATIONSHIP, and ATTRIBUTE.

HYPERMEDIA DESIGN MODEL (HDM): notation for the specification of hypermedia applications.

HYPERTEXT MARKUP LANGUAGE (HTML): language for publishing documents on the Web.

HYPERTEXT TRANSFER PROTOCOL (HTTP): computerized protocol by means of which two computers can exchange multimedia hypertexts. The first computer, called "client", requests a document to the second computer, called "server", which analyzes the request and returns the document, if it is available, or else an error message, if the document is unavailable or the request is not well formed.

LINK: connection between HYPERTEXTS.

HYPERMEDIA: particular hypertexts containing multimedia elements.

HYPERTEXT: non-linear text in which the reading sequence is not defined a-priori, but follows user-defined paths. These paths are made possible by connections among portions of text called LINKS.

INDEX PAGE: a particular kind of NAVIGATION PAGE in WebML.

LOGICAL PAGE: either a DATA PAGE or a NAVIGATION PAGE.

MARKUP LANGUAGE: a language capable of describing the structure or the graphical properties of a text by means of special keywords, called "tags", inserted in the text itself.

MULTIDATA PAGE: a particular kind of NAVIGATION PAGE in WebML.

NAVIGATION PAGE: a WebML construct for the specification of a Web page for supporting a user that wishes to "move" from the DATA PAGE of an object to another DATA PAGE of a different object.

PHYSICAL PAGE: a WebML construct for the specification of a set of PHYSICAL or LOGICAL PAGES, which should be displayed together on the screen.

RELATIONSHIP: a construct that is used in the specification of information systems to describe a meaningful relationship between objects.

SCROLLER PAGE: a particular kind of NAVIGATION PAGE in WebML.

STYLE SHEET: a WebML construct for specifying the way in which a PAGE should be graphically presented in a suitable format.

TARGET: a construct used in the specification of information systems for describing a set of objects which are interrelated and define an application macro-object or a self-standing portion of an application.

TEMPLATE: prototype of Web page with graphical properties but without content, from which it is possible to derive actual Web pages by specifying the content.

TYPE: relative to an ATTRIBUTE, defines the values and the operations that can be done on the information represented by the attribute itself.

TYPED STYLE SHEET: Particular STYLE SHEET applicable only to a given type of page.

Web: Internet application that enables information exchange among remote computers.

Web PAGE: unit of exchange of information on the Web, usually an hypertext written in HTML.

EXTENDED MARKUP LANGUAGE (XML): standard for the definition of markup languages for publishing documents on the Web.

FIG. 1 shows the architecture of the computer tools for the development of Web sites.

As shown in that figure, the designer 1 defines the specifications of a Web site 2 and formalizes such a specification with the help of a computerized tool, called "Web site modeler" 3, which stores the specification in a persistent way as a collection of WebML statements 4.

These statements are the input to a computerized system called "Schema and template generator" 5, which translates the WebML specifications, producing a collection of templates 6 written in a suitable language for integrating databases and the Web and a collection of data schemas and of query programs for data access 7.

The templates 6 are installed in a computer hosting the Web application, where a computer system 8, called "Web server with template processor", is operational.

The data schema and the query programs 7 are loaded on a database management system 9, connected to the Web server 8, and the database is populated with the application data. Then the Web server 8 is made available for access to the users, who request Web pages 10. Following these requests, the Web Server 8 interprets the templates 6 and loads the data required to satisfy the user's request from the database system 9 and builds the Web pages 11 that should be returned to respond to the user's request.

Figure 31:
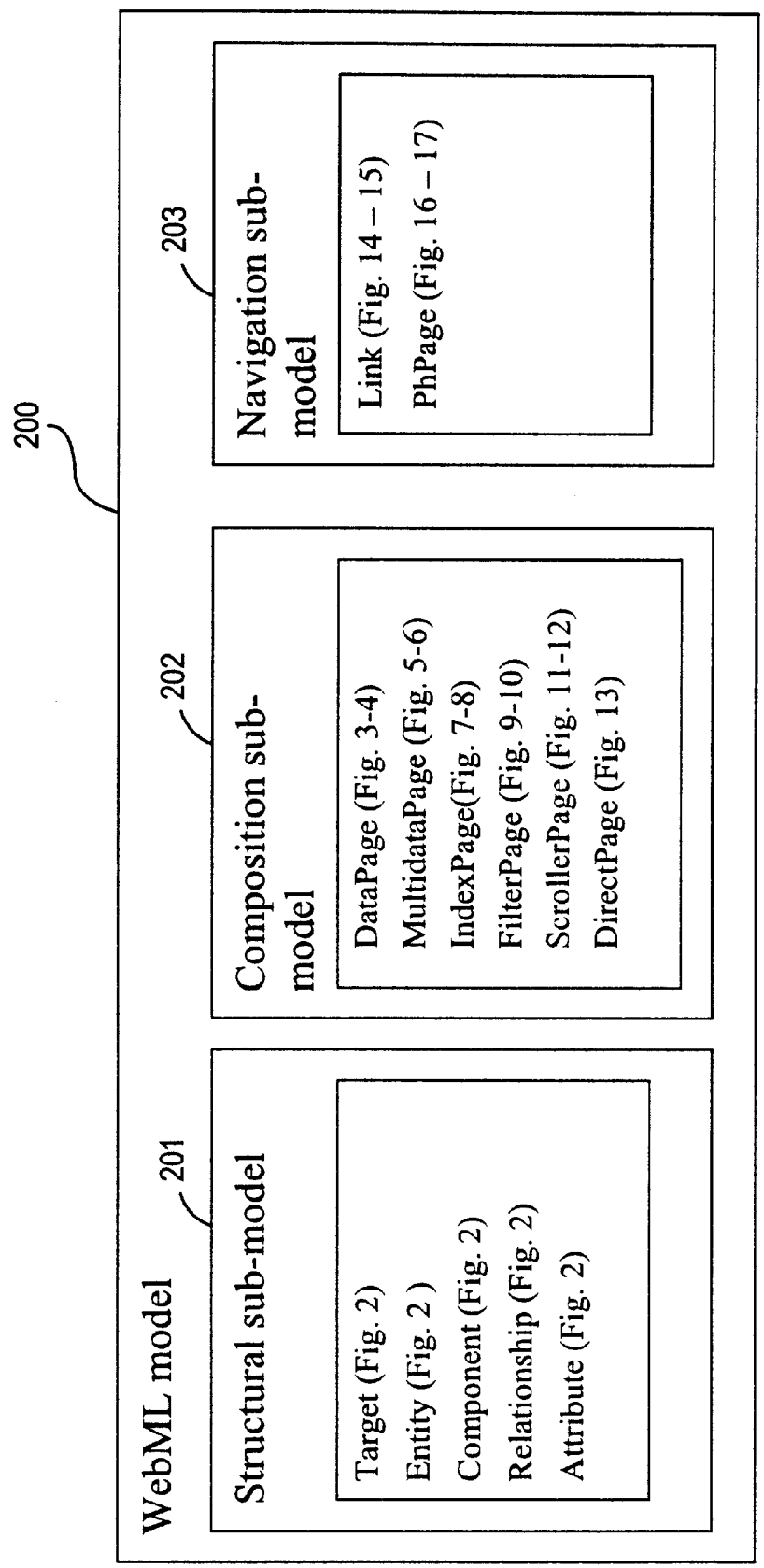
FIG. 31 shows a WebML model 200 according to the present invention which has a structural sub-model 201, a composition sub-model 202 and a navigation sub-model 203.

FIG. 31 shows a WebML model 200 according to the present invention which has a structural sub-model 201, a composition sub-model 202 and a navigation sub-model 203.

The starting point for defining the specifications of a Web site by using WebML is the description of the structural sub-model, i.e., of the conceptual schema of data. This definition permits one to subsequently define the site pages and their navigation and presentation, as discussed in details in the subsequent figures.

WebML offers a textual notation for the representation of the data schema, based on the notions of TARGET, ENTITY, COMPONENT, ATTRIBUTE, and RELATIONSHIP, as it is next exemplified:

```
<TARGET id = "Catalog" label = "Online catalog"
    entryEntity = "Article">
<ENTITY id = "Article" label = "Article">
<ATTRIBUTE id = "Aname" type = "String"
    label = "Article Name"/>
<ATTRIBUTE id = "Adescr" type = "Text"
    label = "Description"/>
<ATTRIBUTE id = "Aprice" type = "Numeric"
    label = "Price"/>
<ATTRIBUTE id = "Atype" type = "String"
    label = "Type"/>
<COMPONENT id = "Image" minCard = "0" maxCard = "N"
    label = "Enlarged Images">
<ATTRIBUTE id = "EnlargedImg" type = "Image"/>
<ATTRIBUTE id = "Caption" type = "Text"/>
</COMPONENT>
<RELATIONSHIP id = "IncludedIn" to = "Combination"
    inverse = "HasArticles"
    minCard = "0" maxCard = "N"
    label = "Also available in the
    combinations"/>
</ENTITY>
<ENTITY id = "Combination" label = "Combination">
<ATTRIBUTE id = "Cname" type = "String"
    label = "Name"/>
<ATTRIBUTE id = "Cprice" type = "Numeric"
    label = "Price"/>
<ATTRIBUTE id = "Cphoto" type = "Image"
    label = "Photo"/>
<ATTRIBUTE id = "Cdescr" type = "Text"
    label = "Description"/>
<RELATIONSHIP id = "HasArticles" to = "Article"
    inverse = "IncludedIn"
    minCard = "2" maxCard = "N"
    label = "Articles in special
    offer"/>
</ENTITY>
</TARGET>
<TARGET id = "Logistics" label = "Logistic Info"
    entryEntity = "Store">
<ENTITY id = "Store" label = "Retail Store">
<ATTRIBUTE id = "Sname" type = "String"
    label = "Name"/>
<ATTRIBUTE id = "Sphoto" type = "Image"
    label = "Picture"/>
<ATTRIBUTE id = "Smail" type = "Url"
    label = "Write to us"/>
<ATTRIBUTE id = "Smap" type = "Image"
    label = "Map"/>
</ENTITY>
</TARGET>
```

A TARGET is a set of data, which defines a self-standing portion of the content of the application. A TARGET is made of one or more ENTITIES interconnected by RELATIONSHIPS. One of such entities is called "entry Entity" and constitutes the entity, that is normally used on the Web as the starting point for accessing the data of the entire TARGET. A relationship expresses a connection between entities, which is meaningful from the application viewpoint, for instance the connection between a combination and the articles that belong to it. These RELATIONSHIPS may connect entities either of the same TARGET or of different TARGETS.

Every ENTITY is characterized by a group of ATTRIBUTES. Every attribute has a name and a type, which describes the admitted values for the attribute, for example: text, image, integer number, and so on. The ENTITIES may also contain COMPONENTS, i.e. groups of sub-objects characterized by a structure made of attributes or possibly other sub-components. Each component has the same life span as the object that includes it. Therefore if a container object is destroyed, also all the component objects that are contained within it are destroyed.

The concepts of target, entity, relationship, attribute, and component define a structural sub-model.

Figure 2:
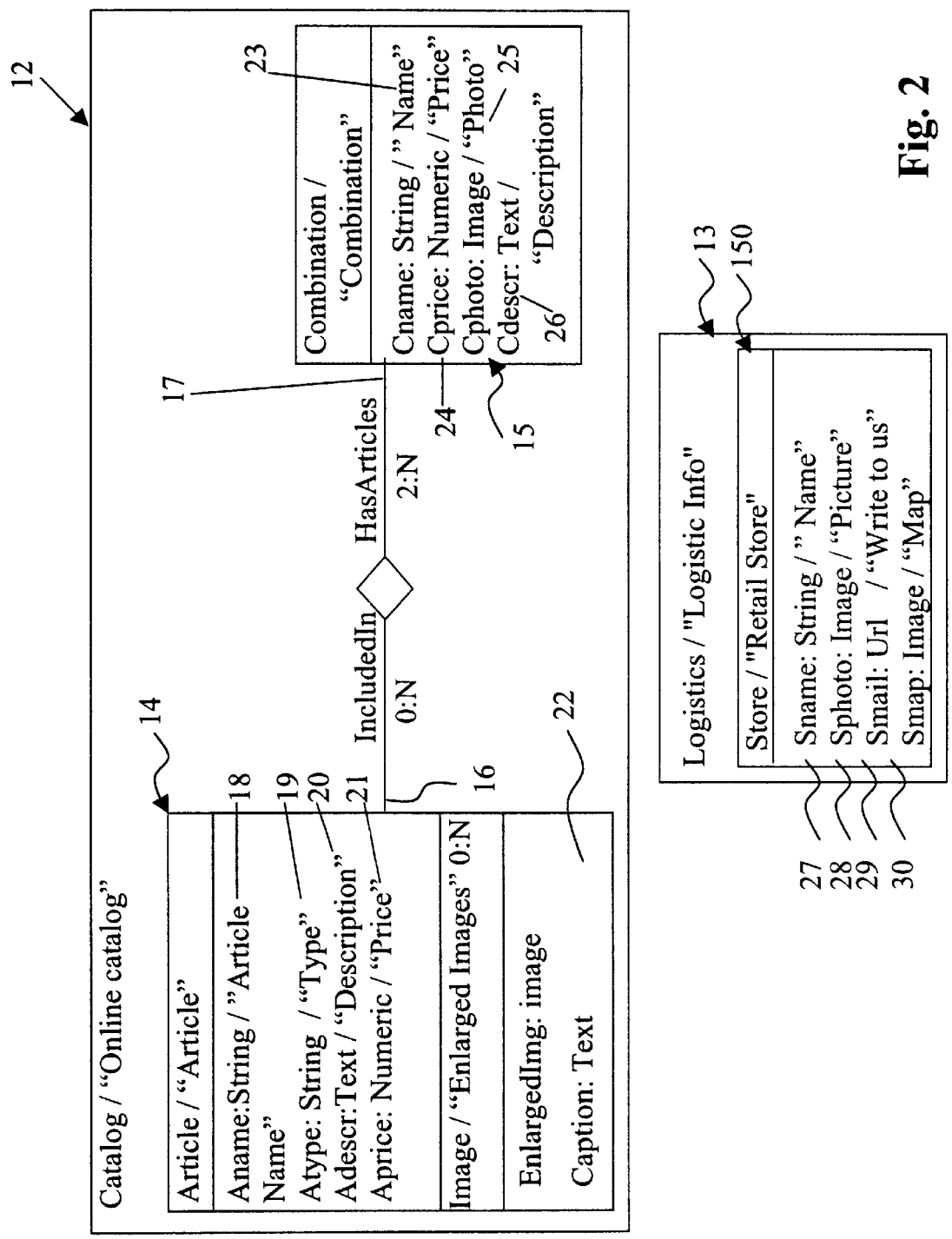
FIG. 2 shows the definition of the conceptual data model.

The structural schemas in WebML can also be graphically represented as in the specific example illustrated in FIG. 2.

The conceptual schema of the example application contains two targets: Catalog 12, called "Online Catalog", and Logistics 13, called "Logistic info".

The target Catalog 12 contains the information relative to articles and special offers, therefore inside it there are the entities 14, called "Article", and 15, called "Combination", connected by means of the relationship 16, called "includedIn", which connects an article to the combinations where the article appears, and the inverse relationship 17, called "hasArticles", which associates each combination to the articles that compose it.

The entity Article 14 contains a group of attributes that describe its features: Aname 18, called "Article Name", Atype 19, called "Type", Adescr 20, called "Description", Aprice 21, called "Price", and a component Image 22, called "Enlarged Images", which describes possible images of the article in various settings, and has its own attributes.

The entity Combination 15, called "Combination", contains a group of attributes that describe precisely its features: Cname 23, called "Name", Cprice, called "Price", Cphoto, called "Photo", and Cdescr, called "Description".

The target Logistics 13 contains an entity Store 150, called "Retail Store", which is characterized by the attributes Sname 27, called "Name", Sphoto 28 called "Picture", Smail 29 called "Write to Us", and Smap 30 called "Map".

A typical Web site is composed of pages written in a markup language, such as HTML, which contain data and services and are suitably interconnected to form a hypertext structure. The composition sub-model of WebML according to the present invention, as described hereinafter, permits one to define logical pages that publish on the Web the entities and the components forming the data model. The pages are next interconnected by means of links, which determine the hypertext structure.

The main type of logical page is the data page. Data pages allow one to express composition rules of logical pages starting from the data of entities and components in the conceptual data schema. The textual syntax by means of which a WebML logical page is defined is exemplified as follows:

```
<DATAPAGE id = "CombinationDataPage"
    entity = "Combination">
<INCLUDE attribute = "Cname"/>
<INCLUDE attribute = "Cprice"/>
<INCLUDE attribute = "Cphoto"/>
<INCLUDE attribute = "Cdescr"/>
</DATAPAGE>
```

Figure 3:
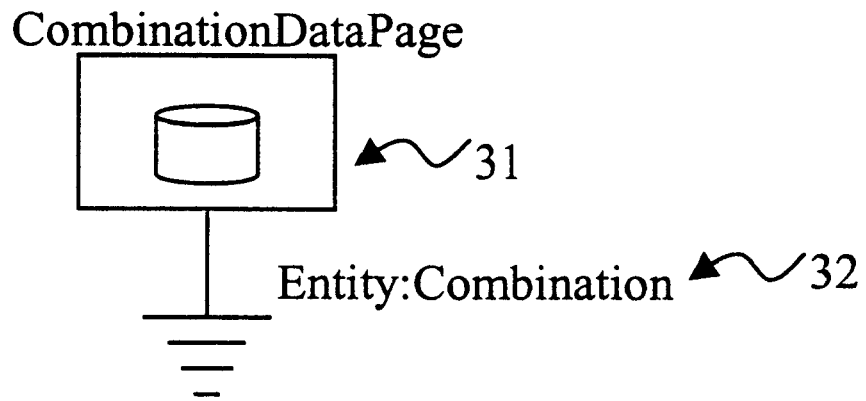
FIG. 3 shows a graphic notation for the definition of a data page.

FIG. 3 shows a graphical notation for a data page.

The construct DATAPAGE is illustrated in the aforementioned figure; it introduces a data page 31, called "CombinationDataPage", relative to entity 32, called "Combination".

A data page is the minimal element for publishing data on the Web.

Figure 4:
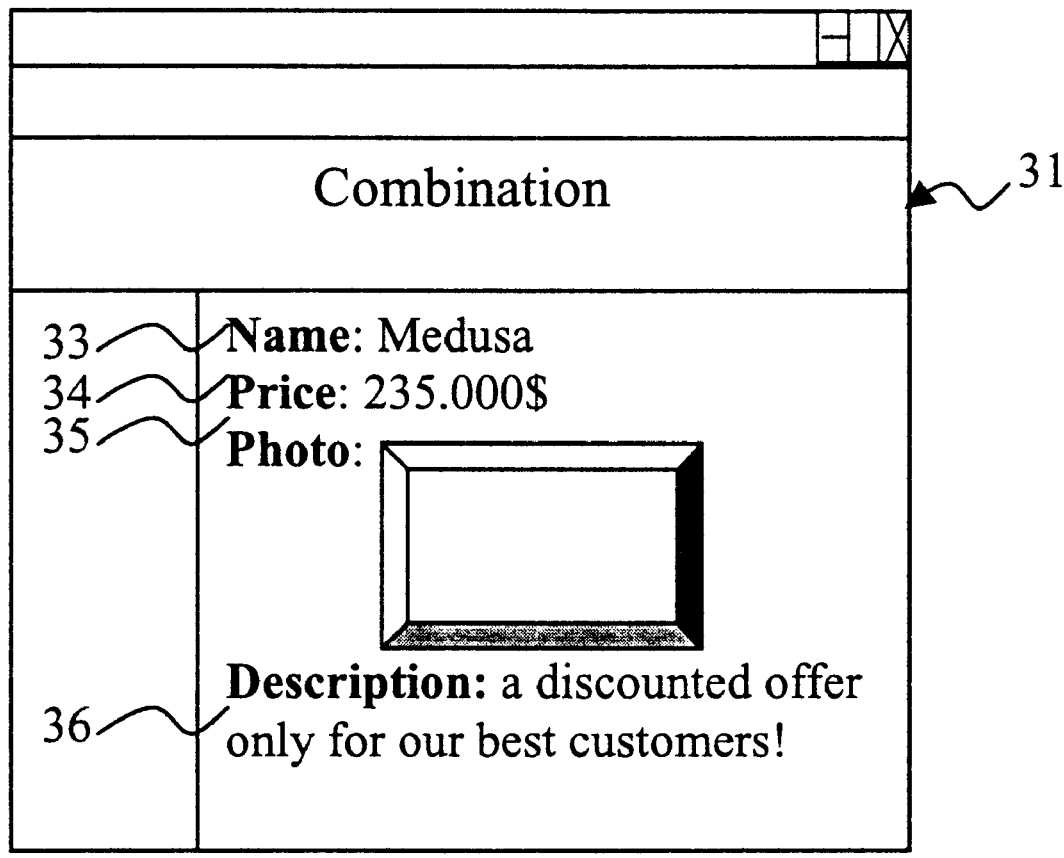
FIG. 4 illustrates an example of data page by means of a Web page.

FIG. 4 illustrates an example of data page by means of a Web page.

The INCLUDE construct, presented in the example of syntax written above, indicates that the four attributes of entity Combination 32 are used in the page: Cname 33, called "Name", Cprice 34, called "Price", Cphoto 35, called "Photo", and Cdescr 36, called "Description". By means of the INCLUDE construct it is also possible to include in a page only a subset of all the attributes of an entity or component.

Figure 5:
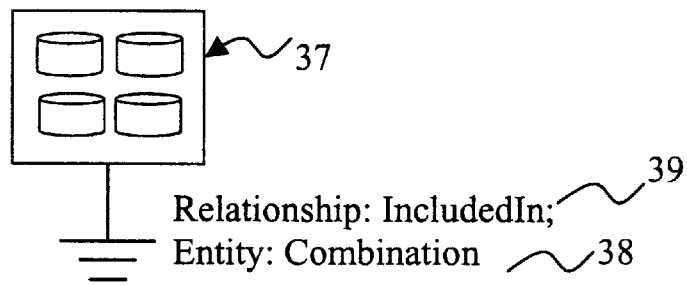
FIG. 5 shows a graphic notation for the definition of a multi-data page.

FIG. 5 shows a graphic notation for the definition of a multi-data page.

The aforementioned figure illustrates the second kind of pages that can be defined in WebML, which is named "multi-data page" 37. It shows the name of the entity or component 38, called "Combination", the name of the relationship 39, called "IncludedIn", the name of the multi-data page 40, called "CombinationMultiDataPage" and of the data page 40, called "CombinationDataPage", which is used by the multi-data page.

As a data page, illustrated in FIG. 3, a multi-data page dictates the attributes that should be used for publishing information on the Web about an entity or component. Differently from a data page, a multi-data page is used for the purpose of presenting several instances of an entity or component at the same time.

The syntax used for defining a multi-data page uses the MULTIDATAPAGE construct. Within this construct, a DATAPAGE construct is used, which contains the specification of an entity or component to which the multi-data page refers to, and the associated INCLUDE constructs. The textual syntax by means of which a multi-data page is defined in WebML is exemplified as follows:

```
<MULTIDATAPAGE id = "CombinationMultiDataPage"
    relationship = "includedIn">
<DATAPAGE id = "CombinationDataPage"
    entity = "Combination">
<INCLUDEALL/>
</DATAPAGE>
</MULTIDATAPAGE>
```

The example shows also the construct INCLUDEALL, which has the same meaning as listing one INCLUDE constructs for each of the attributes defined in the entity or component to which the page refers. INCLUDEALL can be used both for DATAPAGES and for MULTIDATAPAGES.

Multi-data pages have a peculiar aspect in addition to the data pages: the indication of the source of the set of objects that must be shown in the page. Such indication is given, in the MULTIDATAPAGE construct, in the form of a relationship of the conceptual schema or of a collection, as it is shown in the following with reference to FIG. 6.

Figure 6:
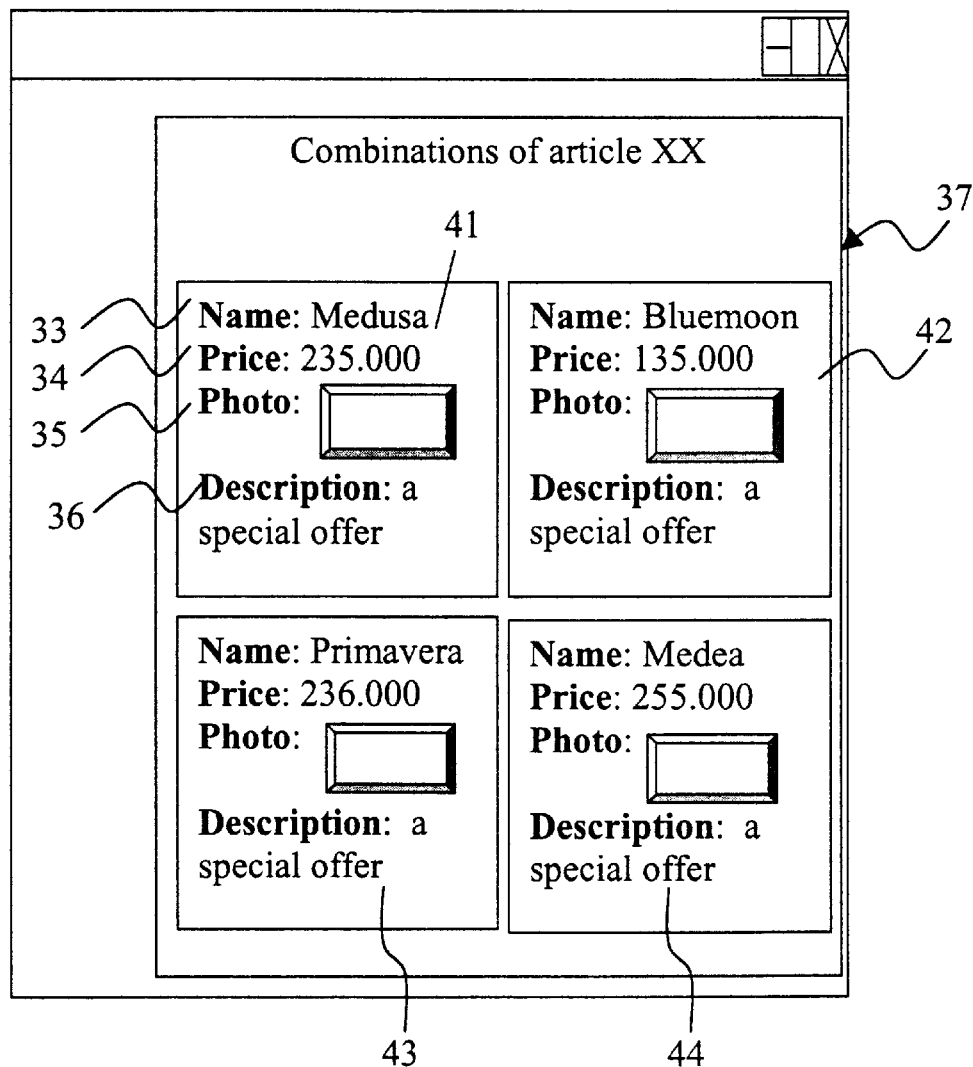
FIG. 6 illustrates an example of multi-data page by means of a Web page.

FIG. 6 illustrates an example of multi-data page by means of a Web page.

The MULTIDATAPAGE construct, illustrated in the syntax example written above, shows the combination of several data pages 41, 42, 43, 44. Each of these pages illustrates the four attributes of the entity Combination 32 that are included in the data page, i.e. Cname 33, Cprice 34, Cphoto 35, and Cdescr 36.

Figure 7:
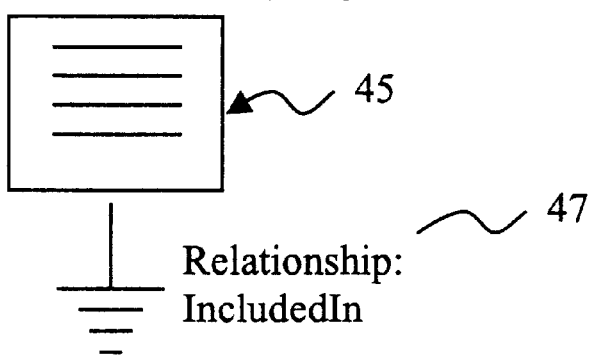
FIG. 7 shows a graphic notation for the definition of an index page.

FIG. 7 shows a graphic notation for the definition of an index page.

The aforementioned figure shows the third type of page that can be defined in WebML, which takes the name of "index page" 45. Like a multi data page, an index page is used with the purpose of presenting several instances of an entity or component at the same time. The figure shows the name of the index page 46, called "CombinationIndexPage", and the name of the relationship 47, called "IncludedIn", which is used for accessing the objects to show.

As in a multi data page, an index page is used for presenting more instances of an entity or component at the same time. However, an index page does not show an entire object, but only a restricted subset of attributes sufficient to compose an index. These attributes take the name of "description key" of the entity or of the component to which the index page refers to, as subsequently shown in FIG. 8.

An example of the WebML textual syntax for the definition of an index page is shown next:

```
<INDEXPAGE id = "CombinationDataPage"
    relationship = "IncludedIn">
<DESCRIPTION key = "Cname Cprice"/>
</INDEXPAGE>
```

The syntax by means of which an index page is defined is based on the use of the INDEXPAGE construct. Inside such construct, the construct DESCRIPTION contains the specification of the attributes used as a descriptive key. The index pages, similarly to the multi-data pages, contain the indication of the source of the set of objects to be shown in the page. Such indication is contained in the construct INDEXPAGE under the name of a relationship of the conceptual data schema or of a collection.

Figure 8:
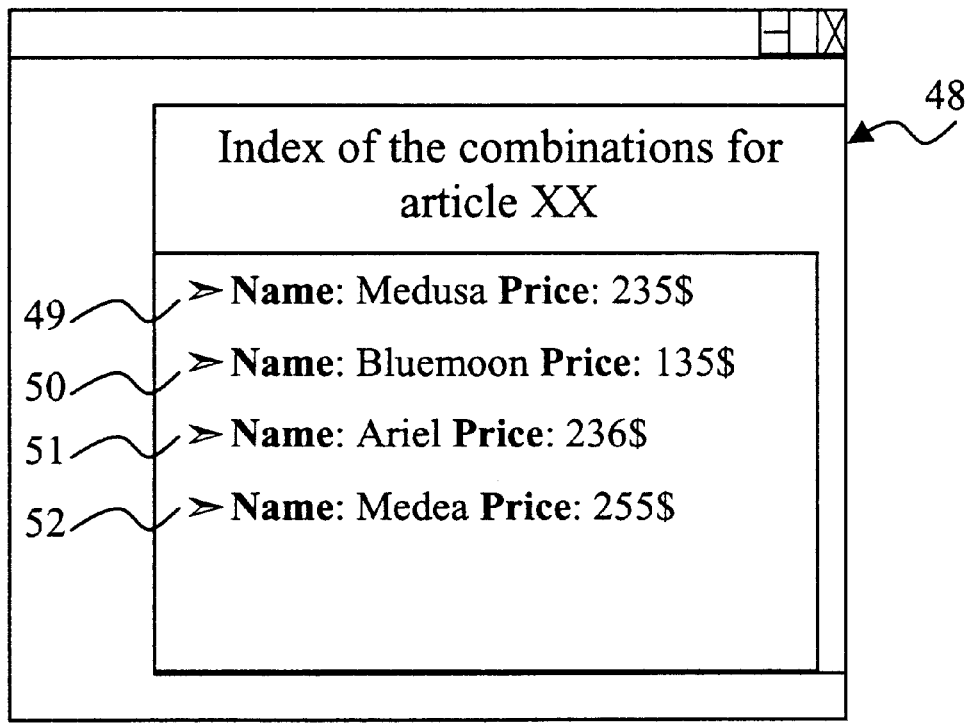
FIG. 8 illustrates an example of index page by means of a Web page.

FIG. 8 illustrates an example of index page by means of a Web page.

An index page 48 is represented as a list of elements 49, 50, 51, and 52. Every element in the list represents the fields of the descriptive key of the objects to be shown, such as "Name" and "Price".

Figure 9:
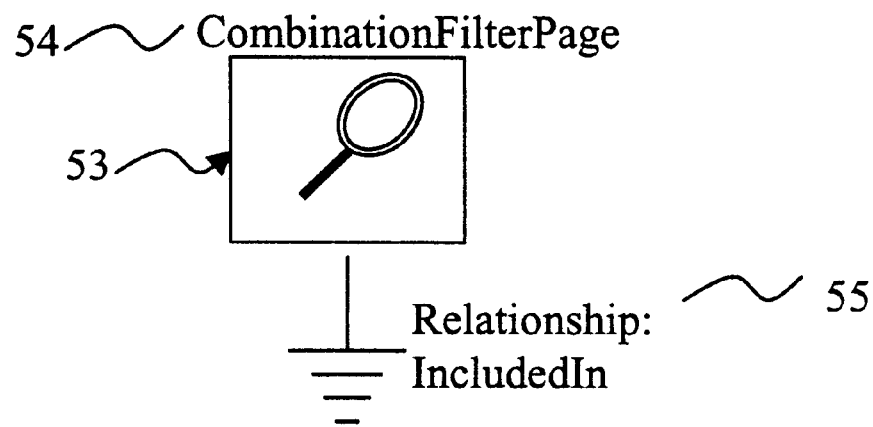
FIG. 9 shows a graphic notation for the definition of a filter page.

FIG. 9 shows a graphic notation for the definition of a filter page.

The aforementioned figure shows the fourth type of page that can be defined in WebML, named "filter page" 53. A filter page 53 is used for the purpose of choosing among several instances of an entity or component those ones that satisfy a criterion provided by the user.

An example of the WebML textual syntax for the definition of a filter page is shown next:

```
<FILTERPAGE id = "CombinationFilterPage"
    relationship = "IncludedIn">
<SEARCHATTRIBUTE name = "Cname"/>
<SEARCHATTRIBUTE name = "Cprice"
    predicate = "between"/>
</FILTERPAGE>
```

The syntax by means of which a filter page is defined uses the construct FILTERPAGE. Inside it, the construct SEARCHATTRIBUTE contains the specification of the search attributes and of the operators (greater than, less than, between, and so on) to be used in the filter evaluation. Filter pages, as index and multi-data pages, contain the indication of the relationship or component that is used to select the objects to be presented in the page.

Figure 10:
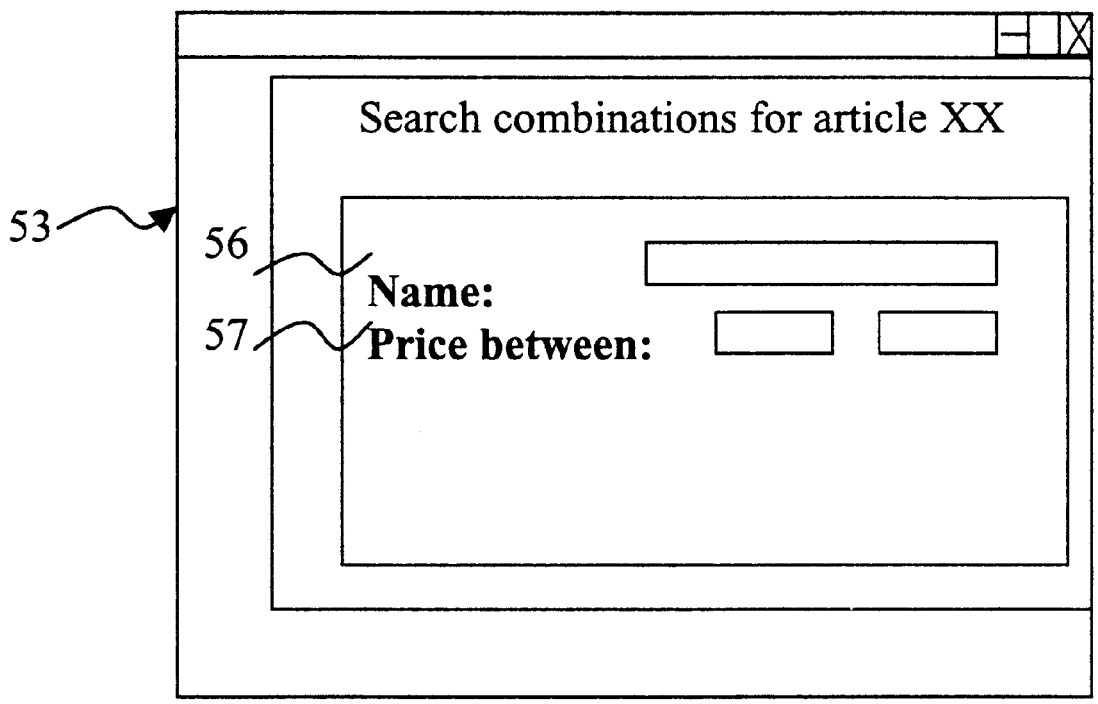
FIG. 10 illustrates an example of filter page by means of a Web page.

FIG. 10 illustrates an example of filter page by means of a Web page.

A filter page 53 shows a form for inserting data, by means of which the user can provide values for some of the attributes of the objects to be filtered, among which 56, called "Name", and 57, called "Price between".

These attributes take the name of search attributes.

A filter page normally contains also a collection of editable fields 56 and 57, one (or two in the case of the specification of a range by means of the "between" predicate) for each search attribute.

Figure 11:
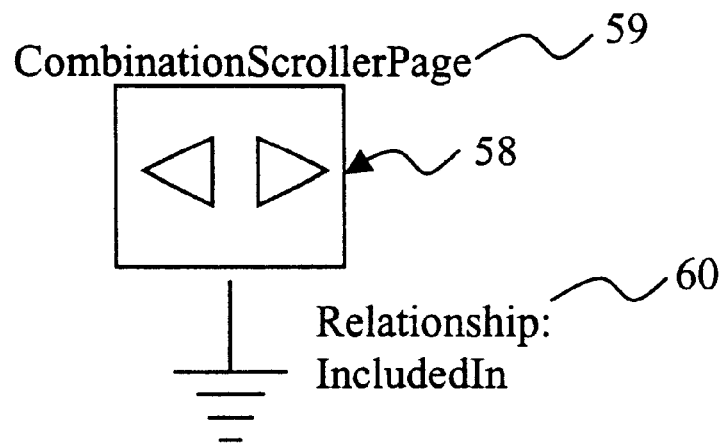
FIG. 11 shows a graphic notation for the definition of a scroller page.

FIG. 11 shows a graphic notation for the definition of a scroller page.

The aforementioned figure shows the fifth type of page that can be defined in WebML, which is named "scroller page" 58. A scroller page is used with the purpose of browsing the pages of a sequence of instances one by one. The example shows the name of the scroller page 59, called "CombinationScrollerPage", and the name of the relationship that contains the objects to be browsed 60, called "IncludedIn".

A scroller page permits one to scan the pages of a sequence of instances of an entity or component one after another. A scroller page contains a set of commands such as "go to", "first", "prev", "next", "last", "position", by means of which the user can scroll the sequence of objects or jump to an object in a given position in the sequence.

These commands take the name of "scrolling commands".

An example of the WebML textual syntax for the definition of a scroller page is shown next.

```
<SCROLLERPAGE id = "combinationScrollerPage"
    relation = "includedIn"
    first = "yes" last = "yes"
    prev = "yes"
    next = "yes" position = "yes"
    toPosition = "yes">
</SCROLLERPAGE>
```

The syntax by means of which a scroller page is defined uses the SCROLLERPAGE construct. Inside it, other constructs dictate the desired browsing commands and the source of the set of objects to be browsed.

Figure 12:
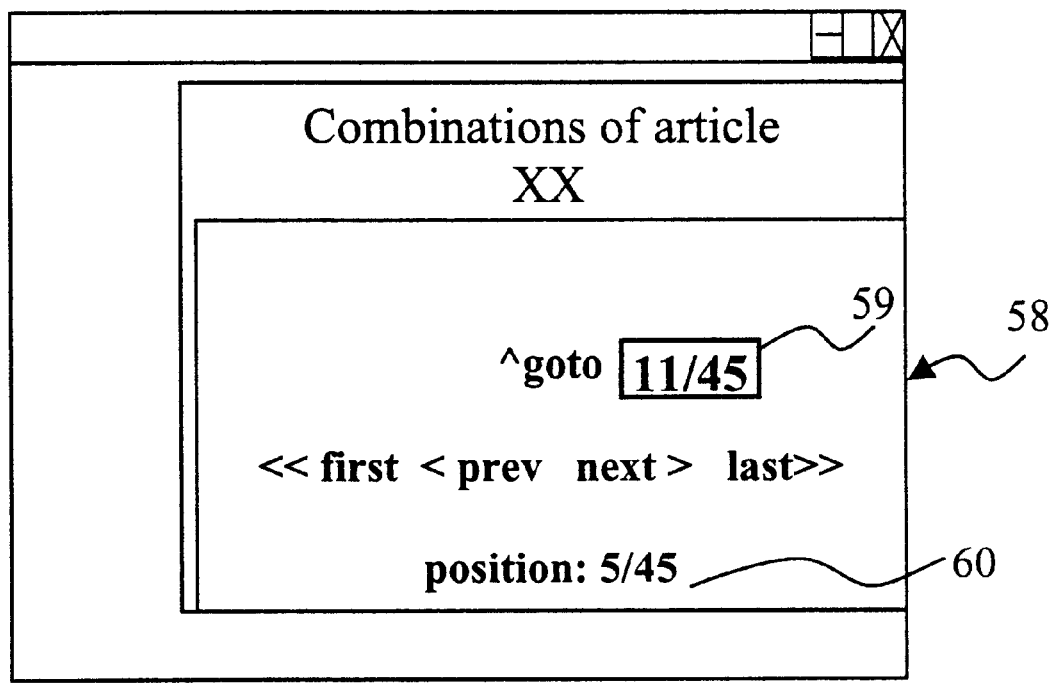
FIG. 12 illustrates an example of scroller page by means of a Web page.

FIG. 12 illustrates an example of scroller page by means of a Web page.

The scroller page 58 has a representation including a set of icons or short texts 59, called "go to" and "<<first<prev next>last>>", one for each enabled scroll command, and one icon or short text 60, called "position", to show the position number of the currently accessed object.

Figure 13:
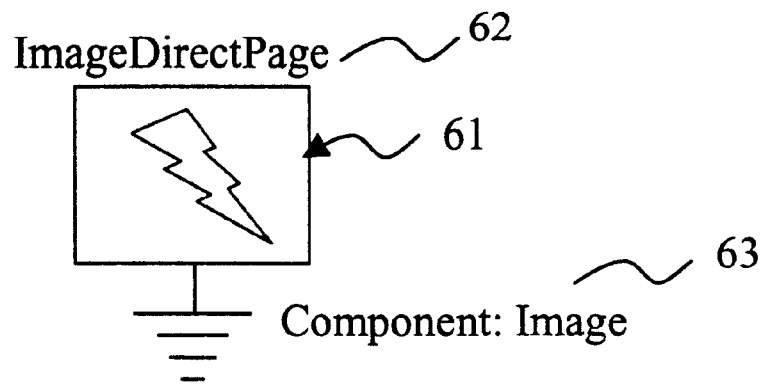
FIG. 13 shows a graphic notation for the definition of a direct page.

FIG. 13 shows a graphic notation for the definition of a direct page.

The aforementioned figure shows the last type of page that can be defined in WebML, called "direct page" 61. A direct page is used to move from a page of an object to another page of another object. The figure contains the name of the direct page 62, called "ImageDirectPage", and the name of the relationship or component 63 to be used for selecting the object to which a direct access is made; in the example, it is the implicit relationship between an image and the relative article, defined by the component called "image".

An example of the WebML textual syntax for the definition of a direct page is shown next.

```
<DIRECTPAGE id = "ImageDirectPage"
    component = "Image">
</DIRECTPAGE>
```

The syntax by means of which a direct page is defined uses the DIRECTPAGE construct; it contains the name of the relationship or component to be used for identifying the object that is directly accessed.

The direct pages are not represented as independent Web pages, but only as hypertext links inside other pages.

The concepts of data, multi-data, index, filter, scroller, and direct logical pages define a composition sub-model according to the invention.

The pages of the various types previously illustrated are not defined in isolation, but they must be connected to form an hypertext structure. The navigation sub-model of WebML according to the present invention, as described hereinafter, offers the concept of link for building hypertext structures.

Figure 14:
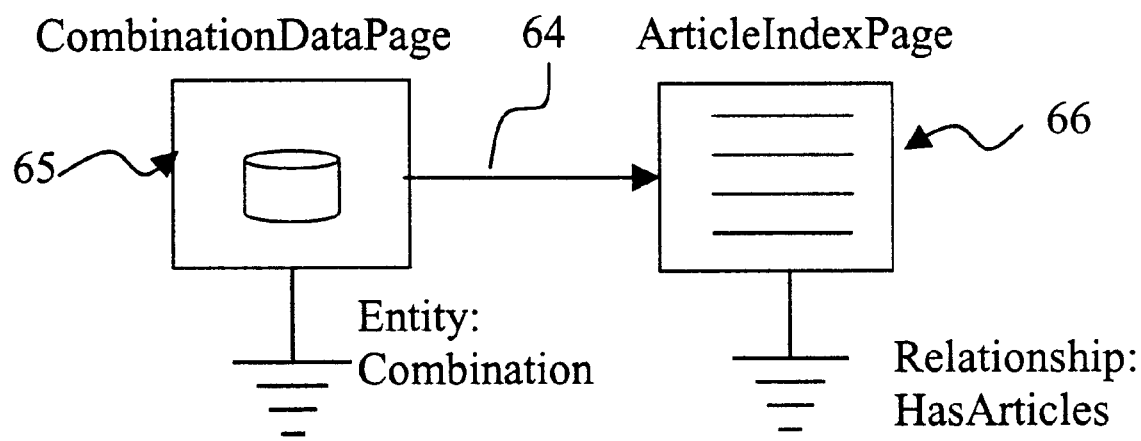
FIG. 14 illustrates a graphic notation for the definition of a connection, named "link"

FIG. 14 illustrates a graphic notation for the definition of a connection 64, named "link". The aforementioned figure illustrates a link that permits to connect a source page 65 to a destination page 66.

An example of the WebML textual syntax for the definition of a link within a page is shown next.

```
<DATAPAGE id = "CombinationDataPage"
    entity = "Combination">
    <LINK id = "11" page = "ArticleIndexPage"/>
</DATAPAGE>
<INDEXPAGE id = "ArticleIndexPage"
    relationship = "HasArticles">
</INDEXPAGE>
```

The syntax uses the LINK construct inside the definition of an arbitrary logical page. A LINK construct contains an identifier and the identification of the page which is "pointed" by the link.

Figure 15:
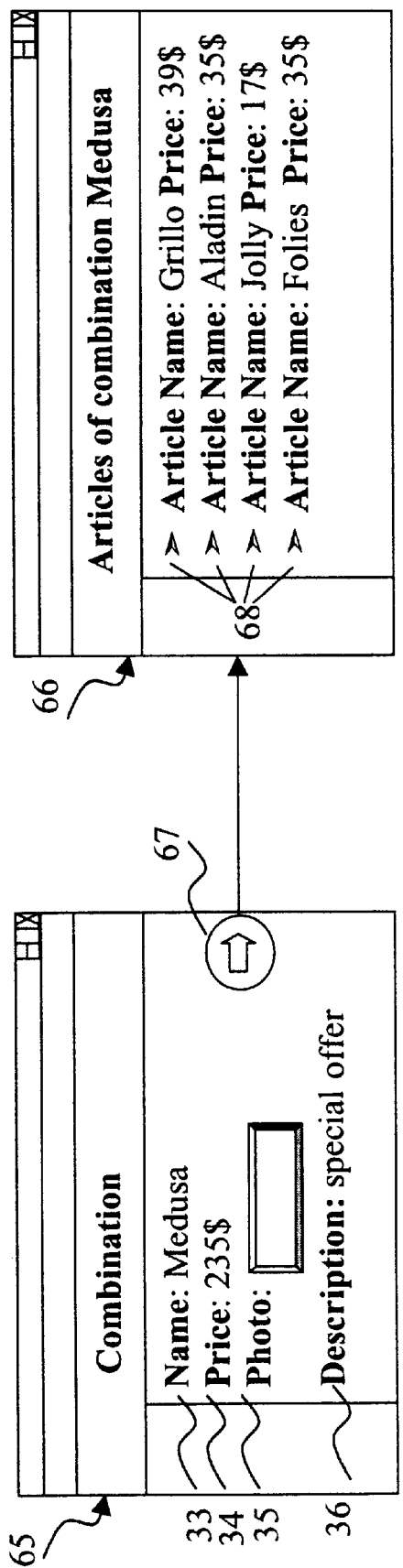
FIG. 15 shows an example of link page by means of a Web page.

FIG. 15 shows an example of link by means of Web pages.

According to what is shown in the figure, the source data page 65, characterized by four attributes, Name 33, Price 34, Photo 35 and Description 36, is connected to the destination page 66 by means of an hypertext link 67, which is activated by a navigation anchor inside the source page 65. The destination page 66 is characterized by a set of entries 68 contained in it.

While the example in FIG. 15 uses two distinct Web pages, a different possibility is to keep both the source page 65 and the destination page 66 on the same screen.

Physical pages are aggregates of logical pages, defined with the purpose of gathering within the same video screen a group of information items that should be presented jointly. The aggregation of logical pages into physical pages is part of the WebML navigation sub-model.

Figure 16:
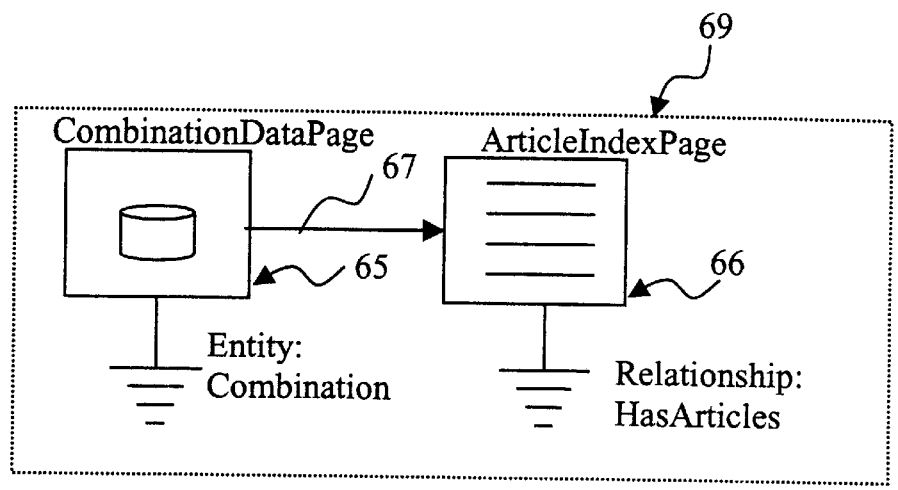
FIG. 16 illustrates a graphic notation for the definition of a physical page.

FIG. 16 illustrates the definition of a physical page.

According to what is illustrated in the aforementioned figure, a physical page 69 is collectively indicated as the aggregation of the logical page 65 connected by means of a link 67 to a logical destination page 66. Graphically, the aggregation of logical pages into physical pages is shown by a dashed line that encloses them.

An example of the textual syntax in WebML for the definition of a physical page by means of two logical pages is shown next. First, two logical pages are defined.

```
<DATAPAGE id = "CombinationDataPage"
    entity = "Combination">
    <LINK id = "11" page = "ArticleIndexPage"/>
</DATAPAGE>
<INDEXPAGE id = "ArticleIndexPage"
    relationship = "HasArticles">
</INDEXPAGE>
```

In order to include these two logical pages in the same physical page, the WebML syntax is:

```
<PHPAGE id = "ph1">
    <PAGE pageid = "CombinationDataPage"/>
    <PAGE pageid = "ArticleIndexPage"/>
</PHPAGE>
```

The syntax by means of which a physical page is defined uses the PHPAGE construct, which permits one to express the logical pages forming a physical page by means of PAGE constructs nested within the PHPAGE construct.

Figure 17:
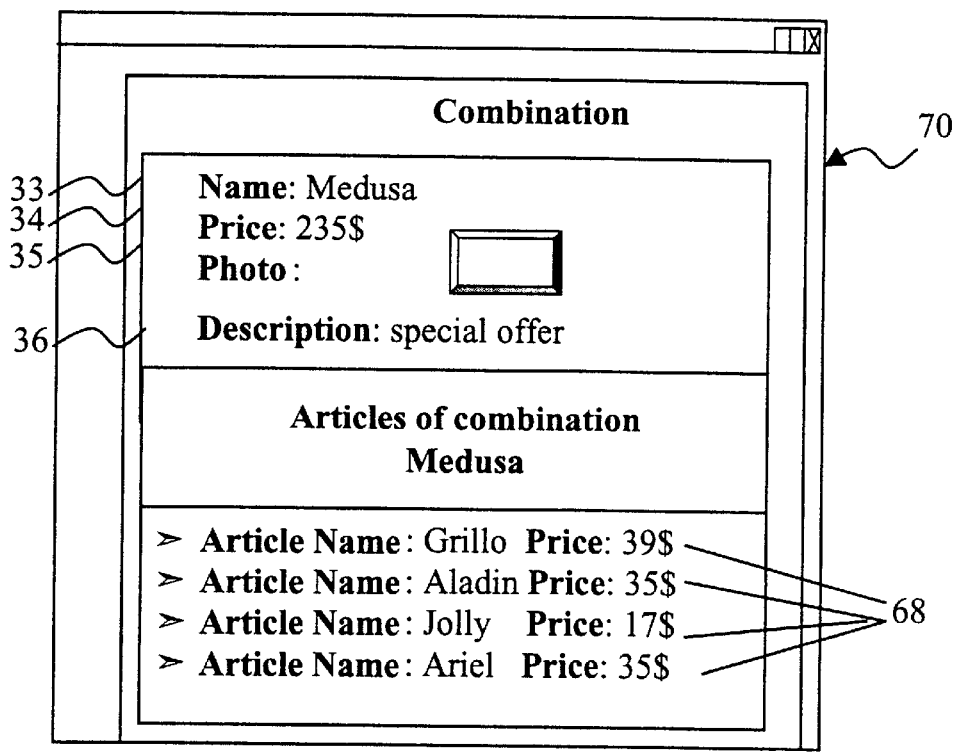
FIG. 17 shows an example of physical page by means of a Web page.

FIG. 17 shows an example of physical page by means of a Web page.

Attributes 33, 34, 35, and 36 of the source logical page 65 are placed on the same screen 70 together with the information 68 of the destination page 66 in such a way as to create a unique physical page 69.

The concepts of link and of physical page define the navigation sub-model according to the invention. It is illustrated hereinafter how the composition and navigation sub-models enable the design of Web sites of arbitrary structure.

Logical and physical pages are the foundations for the construction of a hypertext representing the WEB site. Hypertexts present two different kinds of navigation mechanisms. The first kind is contextual navigation; the second kind is non-contextual navigation.

Contextual navigation proceeds from the page of an object to the page of another object which is semantically connected to the former one by means of a relationship of the conceptual data schema. For instance, the navigation from an article to a combination occurs in the context of a relationship.

A non-contextual path does not take advantage of any relationship from a source page and a target page.

Non-contextual paths require the definition of groups of objects, which can be employed for building indexes for accessing the information. WebML provides the notion of collection in order to define all the possible non-contextual navigation.

A collection is a group of objects clustered for the purpose of building an access point to the information of the site. Collections may also contain other collections, so as to define hierarchical access indexes.

An example of the WebML textual syntax for the definition of a collection is shown next.

```
<COLLECTION id = "Articles">
    <POPULATION range = "Article"/>
</COLLECTION>
```

The syntax by means of which a collection is defined uses the construct COLLECTION. Such construct contains, besides the collection name, the collection population. Such a population can be evaluated with a query upon the data (omitted for simplicity from the illustration examples).

A generic navigation path, contextual or non-contextual, can be defined in different ways. The purpose of navigation modeling is exactly that of defining the desired navigational paths and the page configurations most suitable for supporting them.

In the construction of navigational paths, pages play the following two roles: (a) Pages for data publication: they show the content of one or more entity instances. They are data and multi-data pages. The data publication pages are defined from the entities and components of the data schema. (b) Pages for navigation support: They are defined from relationships of the data schema or from collections of the navigation schema and support the navigation from one data page to another data page. These are the index, filter, scroller, and direct pages. Also multi-data pages support navigation, and at the same time they support data publication, because they enable reaching, in one step, all the objects belonging to a collection or connected by a relationship to a source object.

The general form of a navigation path alternates a data composition page, which plays the role of source page, with one or more navigation pages on the same relationship or collection, and finally a data page, which is the destination page.

By combining in different ways the navigation pages and by placing them differently within physical pages it is possible to specify a great variety of different hypertexts, each relative to the same conceptual data schema and to the same collections.

Figure 18:
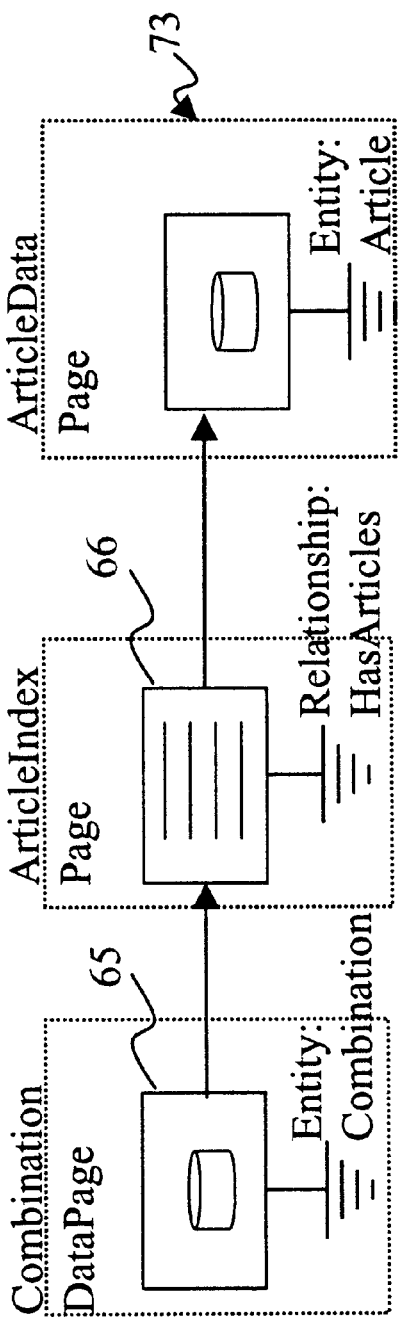
FIG. 18 illustrates a modeling of navigation by means of a detached index.

FIG. 18 illustrates the modeling of a particular hypertext fragment, called "detached index".

The navigation path consists of three logical pages: the source page 65, which describes the source object, an intermediate page 66, which shows the list of objects connected by a relationship with the source object, and the destination page 73, which shows the content of the object selected by a user.

An example of the WebML textual syntax for the definition of detached index navigation is shown next.

```
<DATAPAGE id = "CombinationDataPage"
        entity = "Combination">
    <INCLUDEALL/>
    <LINK id = "11" page = "ArticleIndexPage"/>
</DATAPAGE>
<INDEXPAGE id = "ArticleIndexPage"
        relationship = "HasArticles">
    <LINK id = "12" page = "ArticleDataPage"/>
</INDEXPAGE>
<DATAPAGE id = "ArticleDataPage" entity = "Article">
<INCLUDEALL/>
</DATAPAGE>
```

Each logical page is next associated with a different physical page. A definition in WebML of the example is:

```
<PHAGE id = "ph1">
        <PAGE pageid = "CombinationDataPage"/>
</PHPAGE>
<PHPAGE id = "ph2">
        <PAGE pageid = "ArticleIndexPage"/>
</PHPAGE>
```

```
-continued

<PHPAGE id = "ph3">
        <PAGE pageid = "ArticleDataPage"/>
</PHPAGE>
```

Figure 19:
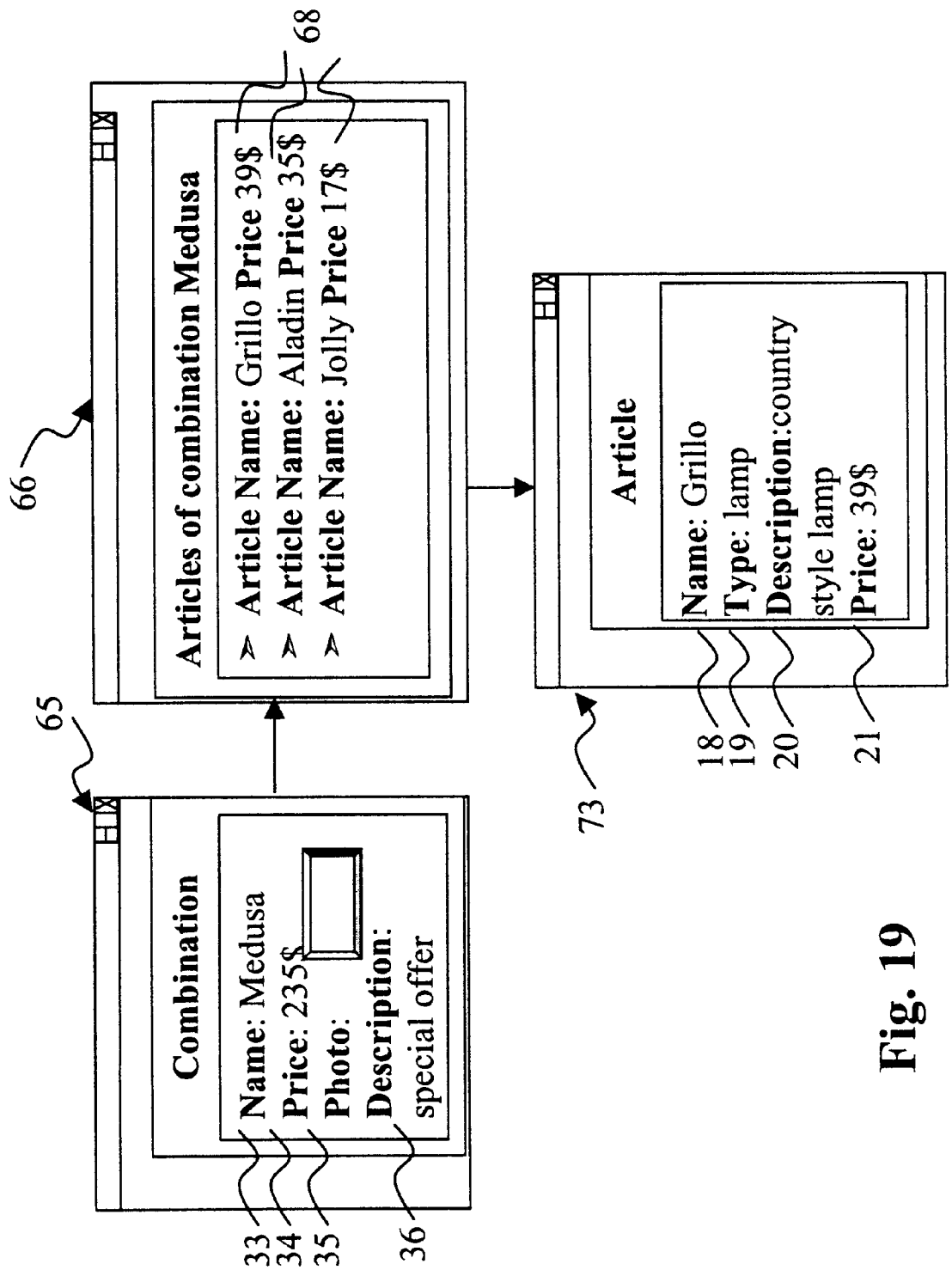
FIG. 19 shows an example of detached index by means of a Web page.

FIG. 19 shows an example of detached index by means of a Web page. According to what is shown in such figure, the source page 65 contains the attributes 33, 34, 35, and 36 of the Combination entity, the intermediate page 66 contains the list of related articles 68 selected by the HasArticles relationship, and the destination page 73 contains the attributes 18, 19,20, and 21 of the Article entity.

Figure 20:
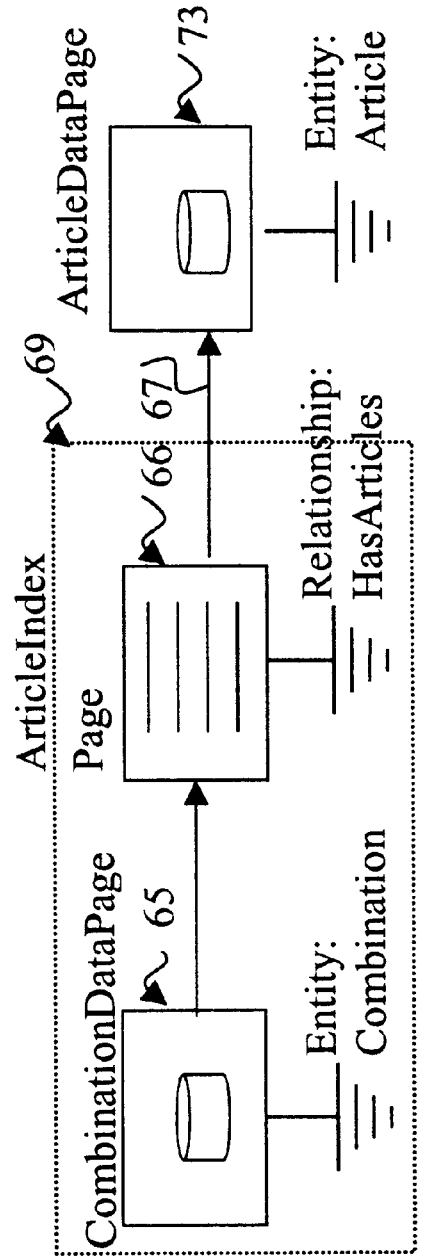
FIG. 20 illustrates a modeling of navigation by means of an embedded index.

FIG. 20 illustrates another particular hypertext fragment, called "embedded index". According to what is shown in such figure, in this example the data page 65 and the index page 66 are placed within the same physical page 69. The index page 66 is connected by a link 67 to the destination page 73.

An example of WebML textual syntax for the definition of an embedded index is shown next.

```
<PHPAGE id = "ph1">
        <PAGE pageid = "CombinationDataPage"/>
        <PAGE pageid = "ArticleIndexPage"/>
</PHPAGE >
<PHPAGE id = "ph2">
        <PAGE pageid = "ArticleDataPage"/>
</PHPAGE >
```

Figure 21:
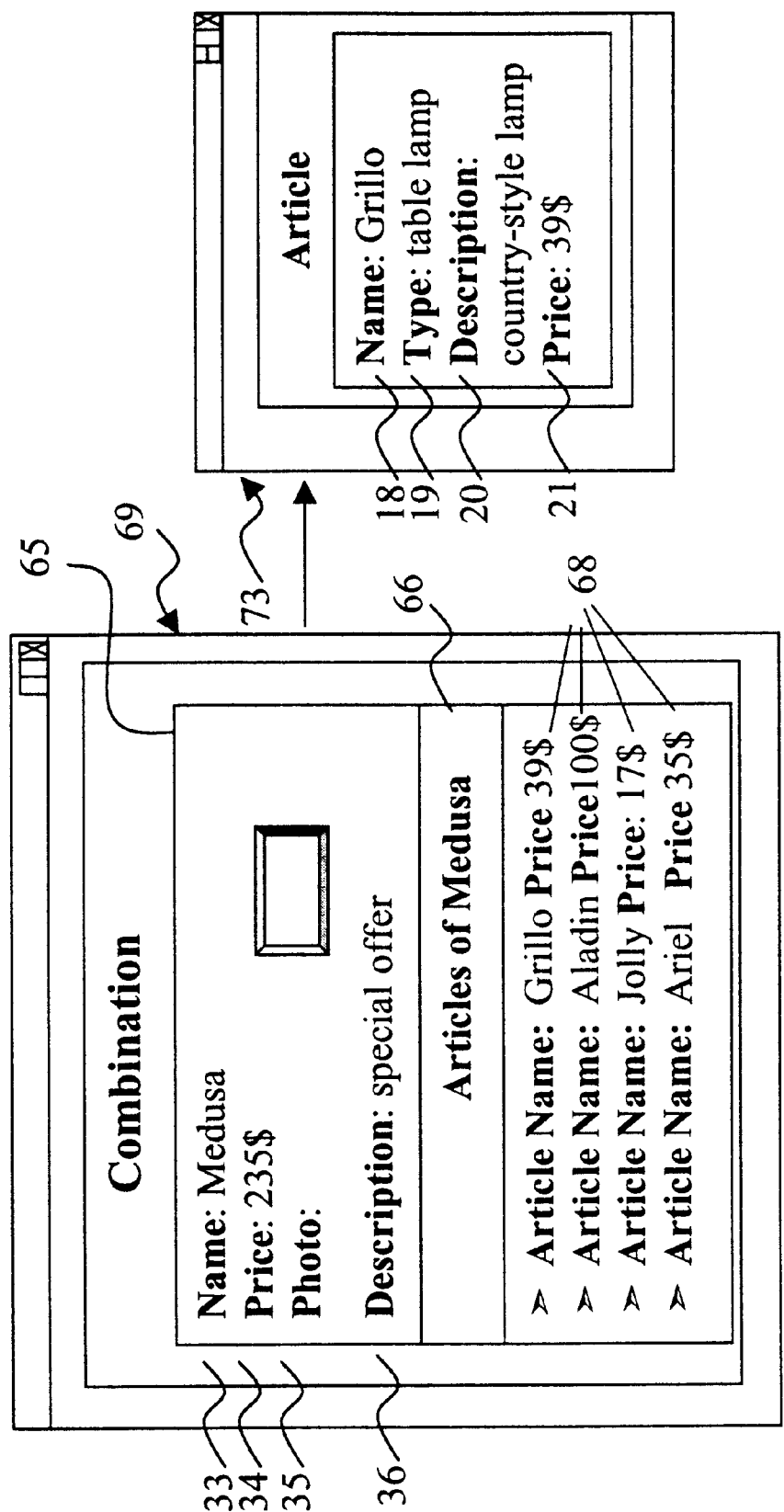
FIG. 21 shows an example of embedded index by means of a Web page.

FIG. 21 shows an example of "embedded index", in which the source page 65 describing the entity Combination with its own attributes 33, 34, 35, and 36 is placed together with the index of the articles 66 containing the list 68 of articles selected by the relationship HasArticles; by selecting one of its entries, it is possible to generate the data 18, 19, 20, and 21 relative to a single article on a different physical page 73.

An important application of the navigation sub-model of WBML is the definition of navigation chains. A navigation chain denotes a sequence of navigation pages defined upon the same relationship or collection and linked to each other. Navigation chains enable a more sophisticated management of navigation, especially in those cases in which a data page must be located by selecting among a large set of objects. The purpose of a navigation chain is to restrict in a gradual way the set of candidate objects that should appear on the destination page, thus enabling a priority-based choice of the user.

Navigation chains can be arbitrarily composed by using the aforementioned five kinds of pages for navigation support.

Figure 22:
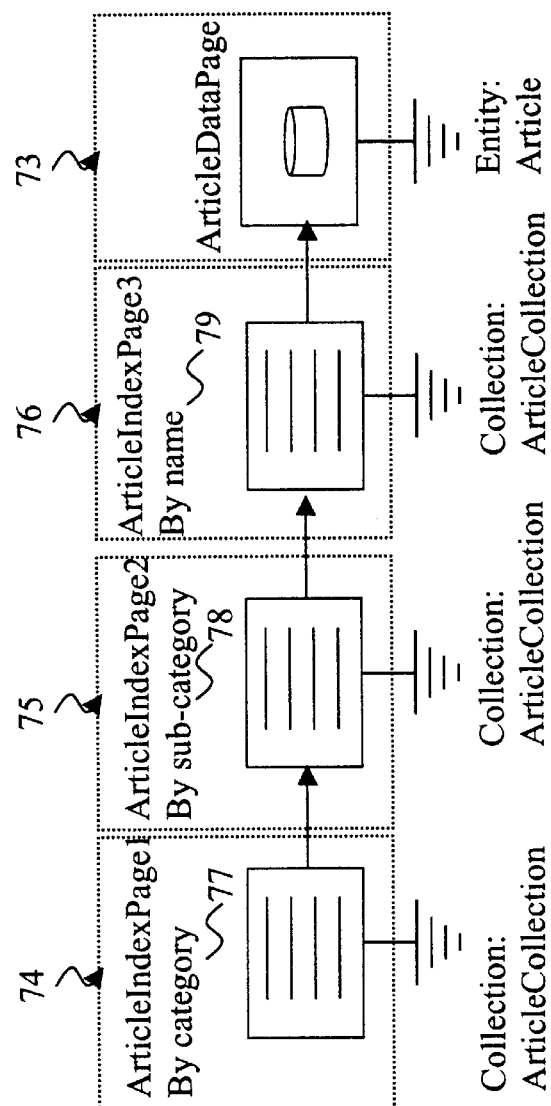
FIG. 22 illustrates a modeling of navigation by means of a multi index.

FIG. 22 shows a particular navigation chain, called "multi-index".

According to FIG. 22, a multi-index is constituted of a sequence of index pages 74, 75 and 76, each of which uses a subset of the attributes of the entity or component in order to form an index with fewer and fewer elements, up to the destination page 73.

For page 74 the index key is the article's category attribute 77, while for page 75 the index key is the sub-category attribute 78 and for the page 76 the index key is the attribute name 79.

Figure 23:
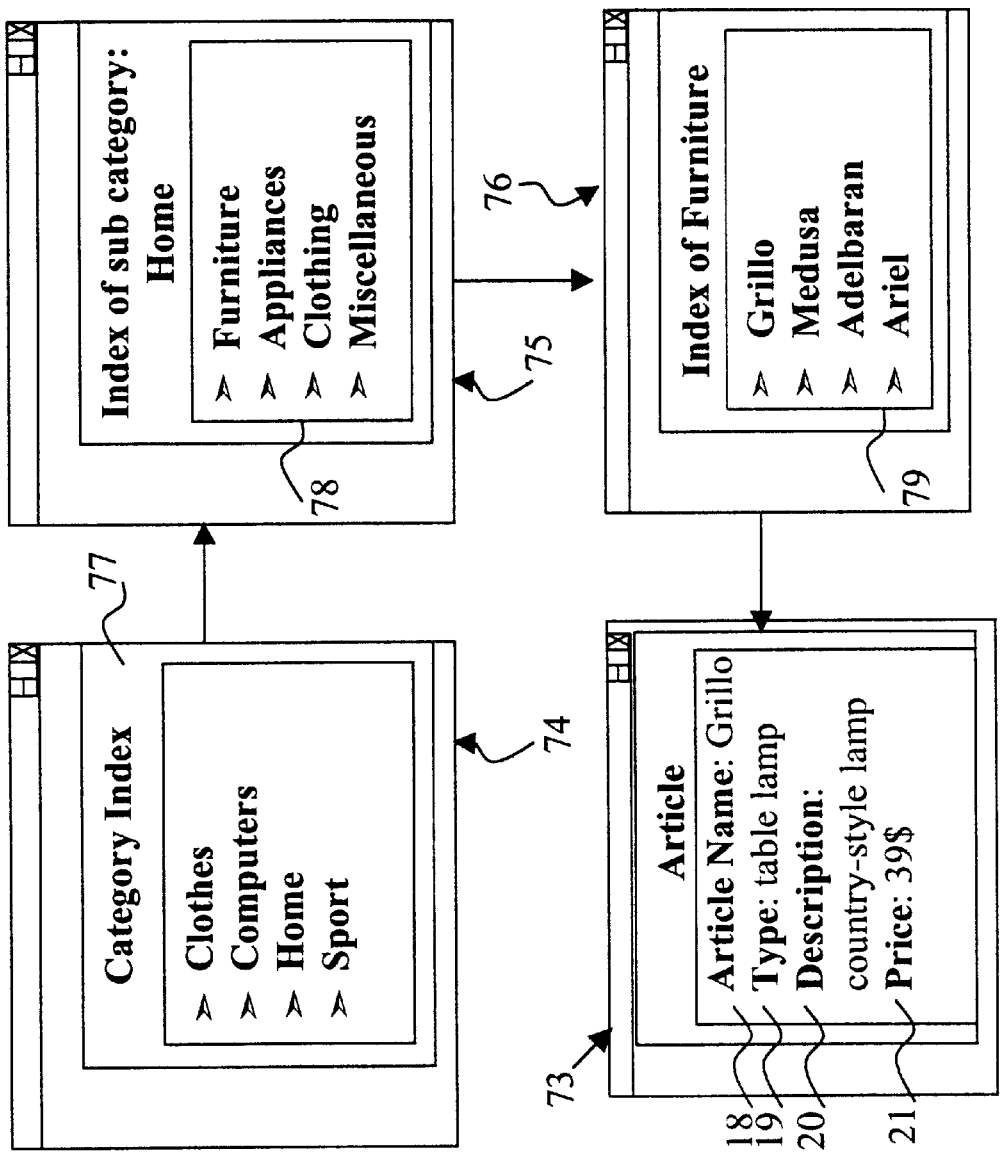
FIG. 23 shows an example of multi index by means of a Web page.

FIG. 23 shows an example of multi index by means of a Web page.

The figure shows that page 74 specifies the category 77, while page 75 specifies the sub-category 78 and page 76 specifies the name attribute 79 as index key. By choosing a particular value of the entries of page 76 the destination page 73 is obtained, which contains the information 18, 19, 20, and 21 about the chosen article.

A different example of navigation chain is the "filtered index". In such case the user can make a first search based on the value of some attributes and then see the index of the objects resulting from the search, to make a further selection among them.

Figure 24:
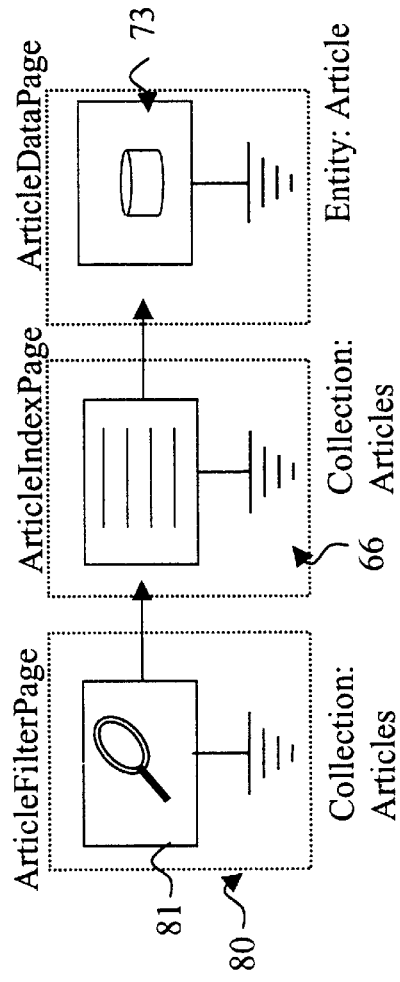
FIG. 24 illustrates a modeling of navigation by means of a filtered index.

FIG. 24 illustrates a modeling of navigation by means of a filter index.

Figure 25:
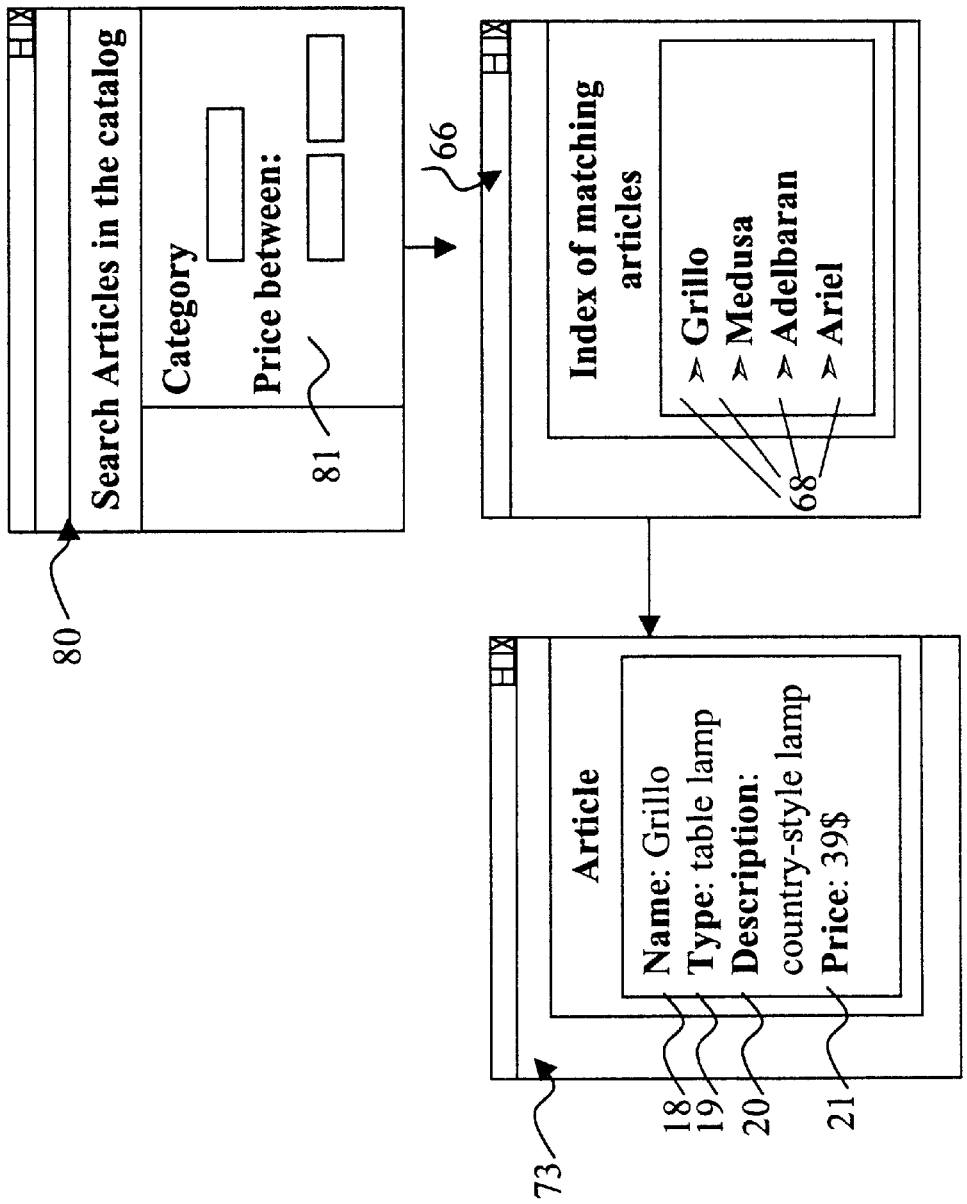
FIG. 25 shows an example of filtered index by means of a Web page.

In the aforementioned figure a first physical page 80 contains a logical filter page 81, called "ArticleFilterPage", which defines the search to be made. This page precedes an index page 66, called "Article IndexPage", so that it is possible to restrict the number of articles among which to choose, to reach a destination page 73, called "ArticleDataPage". FIG. 25 shows an example of filter index by means of a Web page.

The figure shows that the physical page 80, by means of the filter 81, permits one to reach a page 66, containing only those objects which are selected by the filtering criterion 81. These objects are characterized by the list 68, by means of which it is possible to obtain a destination page 73 with the object's attributes 18, 19, 20, and 21.

The last dimension of the conceptual modeling of a Web site concerns the conceptual sub-model for presentation. This sub-model (not described in the present application as it uses style sheets known in the art) permits the specification of the graphical style of the physical pages to be represented on the video screens. Such a style depends on the graphic and layout criteria chosen by the designer, and on the constraints on the graphic rendering of the selected publishing language and of the access device used by the end user. The presentation of a physical page is specified by means of a style sheet, which contains a set of XML constructs capable of determining the screen subdivision into bi-dimensional regions, and the assignment of the content to be shown to each region of the screen.

The composition and navigation sub-models of WebML according to the present invention enable the modeling of arbitrary Web sites starting from arbitrary data schemas. Starting from a conceptual data schema it is possible to model an arbitrary number of sites.

To the purpose of enabling the design of personalized Web sites, WebML provides a construct for representing a particular version of a site, designed to satisfy the requirements of a given category of users. Such construct takes the name of "site view" and is expressed in WebML by means of a syntactic element SITEVIEW with a textual syntax exemplified in the following:

```
<SITEVIEW id = "CustomerView" home = "php1"/>
    <VIEWPAGE phPage = "php1" styleSheet = "home.sty"/>
    <VIEWPAGE phPage = "php2" styleSheet = "stores.sty"/>
    <VIEWPAGE phPage = "php3" styleSheet = "article.sty"/>
    <VIEWPAGE phPage = "php4" styleSheet = "combo.sty"/>
    <VIEWPAGE phPage = "php5" styleSheet = "article.sty"/>
    <VIEWPAGE phPage = "php6" styleSheet = "combo.sty"/>
    <VIEWPAGE phPage = "php7" styleSheet = "article.sty"/>
</SITEVIEW>
```

A site view contains a list of physical pages, each with an associated style sheet that describes its graphic presentation. Inside a site view, the same object can be represented in different ways thanks to the possibility of defining several pages over the same concept.

Different site views can differ for the quantity of information made available to the user, for the offered navigation paths, and for the graphical style of the presentation.

The assumption at the basis of the site view concept is that the runtime execution system should be able to recognize each user as belonging to a user group, either because the user indicates this spontaneously, or because the system infers it from the user's behavior. Once the user group is known, the system shows to the user the pages that are defined in the site view associated with the user's group.

WebML is used as a tool for modeling sites within a general method for the analysis, design, verification, and development of Web sites.

Such a method consists of the following sequence of design steps, which the designer should perform: 1) requirement analysis of the Web application; 2) definition of the structural data schema of the application, using WebML; 3) definition, starting from the structural schema defined at step 2, and verification of one or more hypertexts composed of logical pages connected by links and aggregated within physical pages, using WebML; 4) mapping of each hypertext to one or more user groups; 5) definition of the graphical presentation of the physical pages; 6) definition of the database supporting the structural schema; 7) generation and installation of the page templates starting from the WebML specification.

The creation of a hypertext starting from the structural schema is facilitated by the availability of a standard method for the creation of an hypertext in WebML.

The standard method for the definition of a hypertext is summarized in the following rules:

(a) For every entity, define a data page, which encloses all the attributes;

(b) for every relationship, define a pair of navigational paths in the detached index mode between the data pages connected by the relationships; (c) for every component of each entity, define a multi-data page enclosed in the same physical page as the data page of the entity or component that contains the component itself; (d) for every target, define an index logical page relative to a collection whose population includes all the instances of the entry entity of the target, and include such logical page within a separate physical page; (e) define a navigation chain of type detached index from the logical page of each collection defined for a target, towards the data page of the entry entity of the target; (f) create a collection of collections having as sub-collections all the collections defined on the existing targets; (g) define as the point of access (home page) of the site an index logical page ranging on the collection of collections defined at point (f), such a page is connected via links to the index logical pages ranging on the target-based sub-collections, and is placed in a separated physical page.

Figure 26:
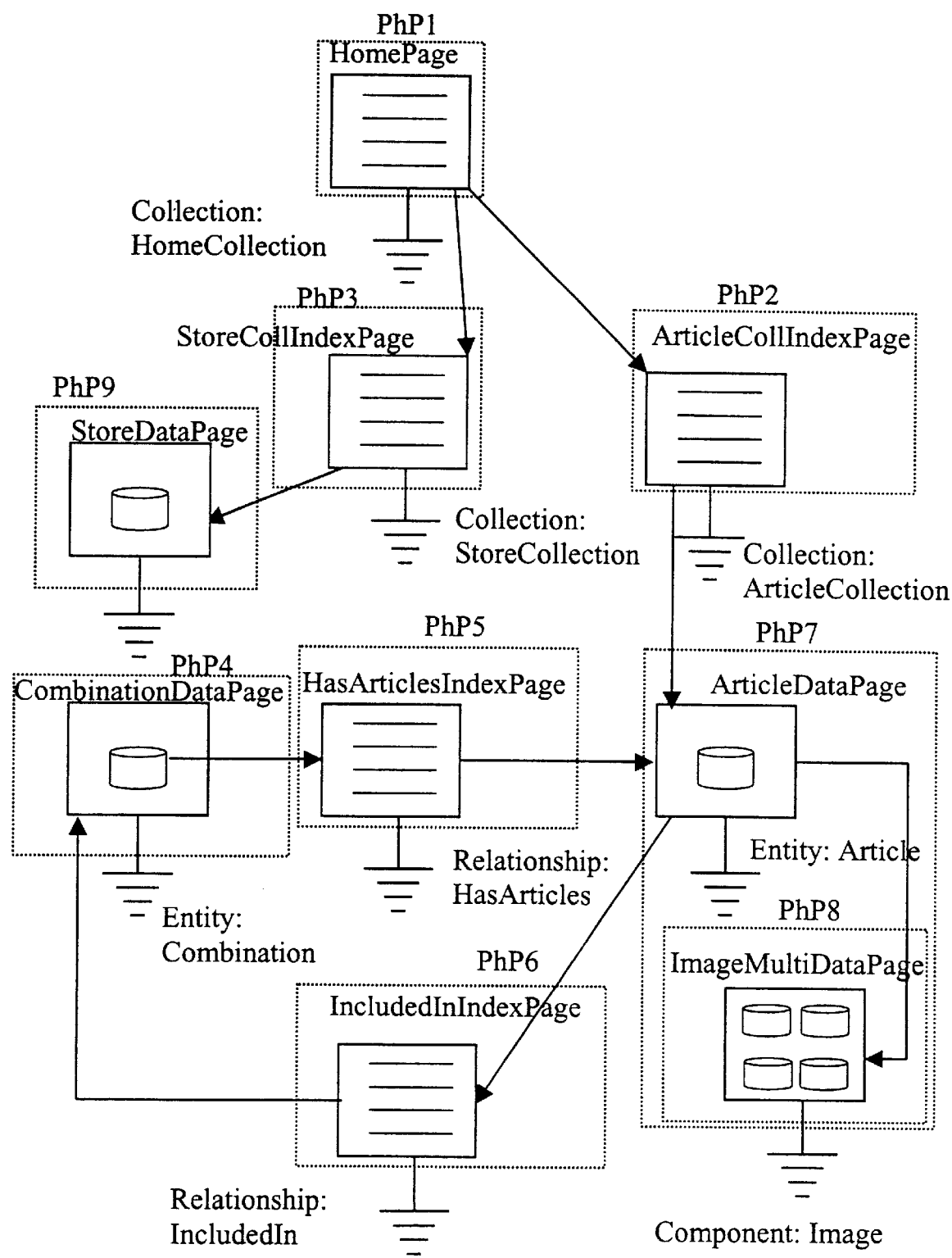
FIG. 26 shows an example of hypertext with logical and physical pages, created with the standard method.

FIG. 26 shows an example of hypertext with logical and physical pages, created with the standard method, starting from the conceptual data schema presented in FIG. 2. The definition of the same logical and physical pages in WebML is described in the following, Initially the two collections relative to the target are defined, as described below:

```
<COLLECTION id = "HomeCollection">
    <SUBCOLLECTION id = "ArticleCollection"/>
    <SUBCOLLECTION id = "StoreCollection"/>
</COLLECTION>
<COLLECTION id = "ArticleCollection">
    <POPULATION range = "Article">
</COLLECTION>
<COLLECTION id = "StoreCollection">
    <POPULATION range = "Store">
</COLLECTION>
Then, logical pages are defined according to the standard method:
<INDEXPAGE id = "HomePage"
        collection = "HomeCollection"/>
    <LINK id = "11" page = "ArticleCollIndexPage"/>
    <LINK id = "12" page = "StoreCollIndexPage"/>
</INDEXPAGE>
<INDEXPAGE id = "ArticleCallIndexPage"
        collection = "ArticleCollection">
    <LINK id = "13" page = "ArticleDataPage"/>
</INDEXPAGE>
<INDEXPAGE id = "StoreCollIndexPage"
        collection = "StoreCollection">
    <LINK id = "14" page = "StoreDataPage"/>
</INDEXPAGE>
<DATAPAGE id = "ArticleDataPage" entity = "article">
    <INCLUDEALL/>
    <LINK id = "15" page = "IncludedInIndexpage"/>
    <LINK id = "16" page = "ImageMultidatapage"/>
</DATAPAGE>
<DATAPAGE id = "CombinationDataPage"
        entity = "Combination">
    <INCLUDEALL/>
    <LINK id = "17" page = "HasArticlesIndexpage"/>
</DATAPAGE>
<INDEXPAGE id = "HasArticlesIndexpage"
        relationship = "HasArticles">
    <LINK id = "18" page = "ArticleDataPage"/>
</INDEXPAGE>
<INDEXPAGE id = "IncludedInIndexPage"
        relationship = "IncludedIn">
    <LINK id = "19" page = "CombinationDataPage"/>
</INDEXPAGE>
<MULTIDATAPAGE id = "ImageMultidataPage"
        component = "Image">
    <DATAPAGE id = "ImageDataPage"
        component = "Image">
        <INCLUDEALL/>
    </DATAPAGE>
</MULTIDATAPAGE>
<DATAPAGE id = "StoreDataPage"
        entity = "Store">
    <INCLUDEALL/>
</DATAPAGE>
Then, physical pages are defined according to the standard method:
<PHPAGE id = "php1">
    <PAGE pageid = "HomePage">
</PHPAGE>
<PHPAGE id = "php2">
    <PAGE pageid = "StoreCollIndexPage">
</PHPAGE>
<PHPAGE id = "php3">
    <PAGE pageid = "ArticleCollIndexPage">
</PHPAGE>
<PHPAGE id = "php4">
    <PAGE pageid = "CombinationDataPage">
</PHPAGE>
<PHPAGE id = "php5">
    <PAGE pageid = "HasArticlesIndexPage">
</PHPAGE>
<PHPAGE id = "php6">
    <PAGE pageid = "IncludedInIndexPage">
</PHPAGE>
<PHPAGE id = "php7">
    <PAGE pageid = "ArticleDataPage">
    <PAGE pageid = "ImageMultiDataPage">
<PHPAGE id = "php8">
    <PAGE pageid = "ImageDataPage">
</PHPAGE>
<PHPAGE id = "php9">
    <PAGE pageid = "StoreDataPage">
</PHPAGE>
```

A further aspect of the method for specifying Web sites using WebML concerns the verification of the correctness of the specification. Indeed, not all the sites obtained by arbitrarily connecting logical pages by means of links correspond to Web sites conceptually correct and practically feasible.

The first verification of the correctness of the specification of a WebML site requires the definition of the concept of "valid logical hypertext" starting from a conceptual data model and from a set of collections. A logical hypertext is a set of logical pages interconnected by links.

A valid logical hypertext is defined by the following rules: (a) Initial hypertext: a logical hypertext constituted only by a navigation chain which is based on a collection and terminates on a data page at the end of such chain is valid; (b) addition of contextual navigation: the logical hypertext obtained from a logical hypertext by adding a navigation chain upon a relationship which originates on a data page of the valid logical hypertext and terminates on a data page (either a new one or a data page already present in the valid logical hypertext) is still valid; (c) addition of non-contextual navigation: the logical hypertext obtained from a valid logical hypertext by adding a navigation chain upon a collection, which terminates on a data page (either a new one or a data page already present in the valid logical hypertext), is still valid. The initial page of such a non-contextual navigation can be reached by using a link from any page of the valid hypertext.

Figure 27:
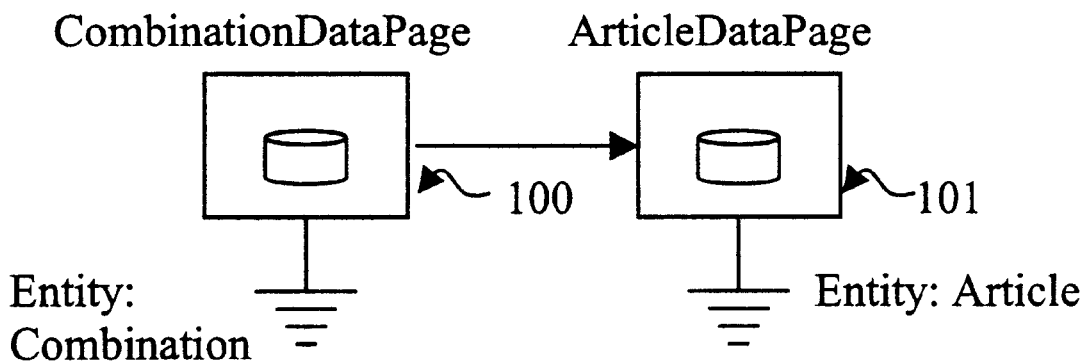
FIG. 27 illustrates an invalid logical hypertext.

FIG. 27 illustrates an example of invalid logical hypertext.

The aforementioned figure shows a navigation, which starts from a data page defined upon the Combination entity 100, towards a data page 101, which shows the content of a particular Article entity. The lack of a navigation page between the two data pages makes the logical hypertext invalid (indeed, the article to be shown after following the link from page 100 to page 101 is undefined).

Figure 28:
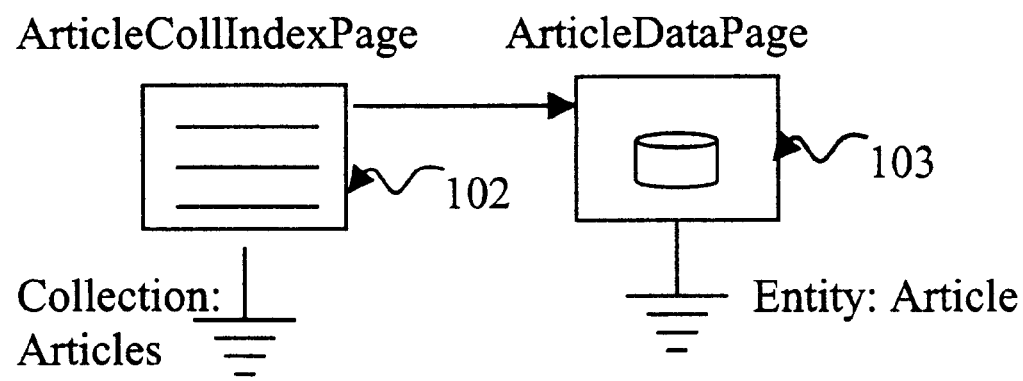
FIG. 28 illustrates a valid logical hypertext.

FIG. 28 illustrates a valid logical hypertext.

The aforementioned figure shows a navigation, which starts from an index page on a collection 102, which contains all the articles, to a data page 103, which shows the content of a particular article of the collection.

The validity of such a hypertext descends from the application of the aforementioned rule (a).

A second verification of correctness is based on the definition of valid physical hypertext and deals with the verification that the aggregation of logical pages into physical pages produces screens of the application whose content can be computed.

A logical page is called "bound" if: (a) it is a navigation page of a collection; (b) it is a data page placed at the destination of a navigation chain on a collection which is placed in the same physical page.

Bound pages can always be displayed on the screen, regardless of which other pages appear in the same physical page. This peculiarity is due to the fact that bound pages always start from a page defined on a collection. Such a collection is a well-defined set of objects, independent of any other concept in the conceptual schema.

Given a valid logical hypertext, the rules for grouping the logical pages within physical pages are the following: (a) every physical page must contain at least one logical page that is the destination of a link which starts externally of the physical page itself; such pages are called entry points of the physical page; (b) every non-restricted logical page within a physical page that is not bound should be reachable starting from all the entry points of the physical page, by following chains of pages and links.

Rule (a) excludes "isolated" pages, i.e., unreachable from other physical pages.

Rule (b) indicates that all logical pages require a context, i.e., that all data pages showing objects which are connected with other objects by means of relationships be connected to all the entry points of the physical page. This property guarantees that, regardless of the path by means of which the user has reached the physical page, there is a chain of relationships and objects that brings from the entry point to any page "with context", which permits the construction of the page's content.

Figure 29:
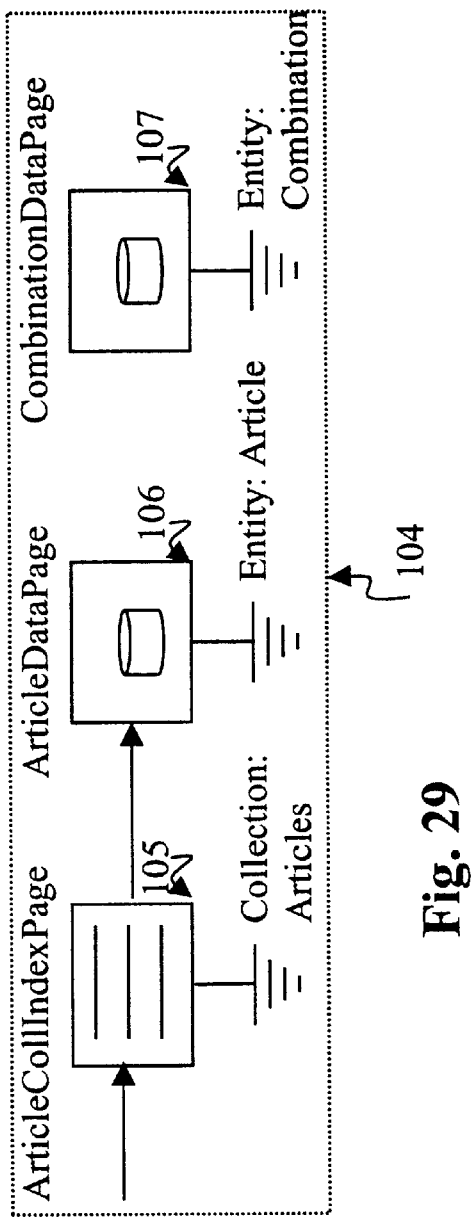
FIG. 29 illustrates an invalid physical hypertext.

FIG. 29 illustrates an invalid physical hypertext. As it is shown by the aforementioned figure, the physical page 104 includes an entry point 105 constituted by a navigation page on a collection, a data page 106 connected to it, and an isolated data page 107. On accessing the physical page by means of the entry link into the page 105, the content of the data page 107, which is not connected by a link to the page 105, is undefined.

Figure 30:
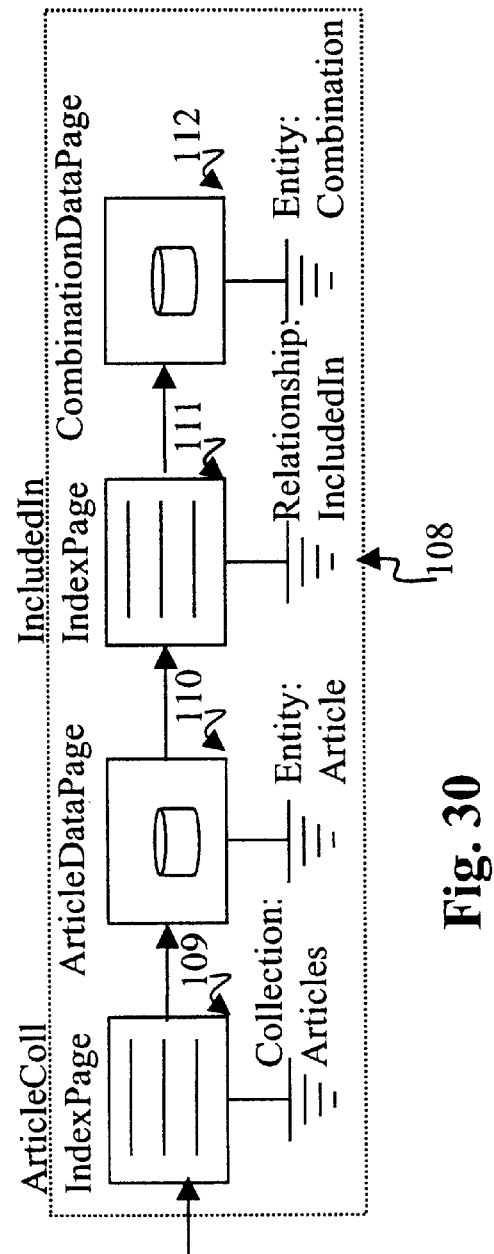
FIG. 30 illustrates a valid physical hypertext.

FIG. 30 illustrates a valid physical hypertext.

As it is shown by the aforementioned FIG. 30, a physical page 108 contains an index page on a collection 109, which contains all articles, called "ArticleCollIndexPage", a data page 110, called "ArticleDataPage", which contains an article selected by the user among those visualized in page 109, an index page 111, called "IncludedInIndexPage", which contains all the combinations to which the article shown in page 110 belongs and finally a data page 112, called "CombinationDataPage", which shows a combination chosen among those listed in page 111. The hypertext is valid because with progressive selections on the content of index pages 109 and 111 all the content of the data pages can be selected and displayed.

What is claimed is:

1. A model for the design, verification, and implementation of World Wide Web sites, comprising:

a structural sub-model, a composition sub-model and a navigation sub-model, wherein the structural sub-model contains target, entity, attribute, component and relationship structural elements which make it typed, the composition sub-model provides for defining logical pages using the structural elements of the structural sub-model, wherein the logical pages comprise six different kinds of pages, where the first kind is a data page, the second kind is a multidata page, the third kind is an index page, the fourth kind is a filter page, the fifth kind is a scroller page, and the sixth kind is a direct page, and the navigation sub-model provides for connecting the logical pages of the composition sub-model by means of links to form a logical hypertext and to cluster said logical pages within physical pages.

2. Model for the design, verification, and implementation of World Wide Web sites according to claim 1, further characterized by the fact the aforementioned data page includes the indication of a reference entity or component (DATAPAGE construct) and the indication of a set of attributes of such entity or component (INCLUDE and INCLUDEALL constructs).

3. Model for the design, verification, and implementation of World Wide Web sites according to claim 1, further characterized by the fact the aforementioned multi data page includes the indication of a reference relationship or component for the joint representation of a group of instances (MULTIDATAPAGE construct), the mention of the entity or component (DATAPAGE construct) and the mention of a set of attributes of such entity or component (INCLUDE and INCLUDEALL constructs).

4. Model for the design, verification, and implementation of World Wide Web sites according to claim 1, further characterized by the fact the aforementioned index page includes the mention of a reference relationship or collection for the representation of the instances of the index (INDEXPAGE construct) and the mention of the attributes to be used as the index descriptive key (DESCRIPTION construct).

5. Model for the design, verification, and implementation of World Wide Web sites according to claim 1, further characterized by the fact the aforementioned filter page includes the mention of a reference relationship or collection for the selection of several instances that satisfy a search criterion expressed by the user (FILTERPAGE construct) and the mention of the search attributes to be enclosed within a search form (SEARCHATTRIBUTE construct).

6. Model for the design, verification, and implementation of World Wide Web sites according to claim 1, further characterized by the fact the aforementioned scroller page includes the mention of a reference relationship or collection for browsing the pages of a list of instances of an entity or component (SCROLLERPAGE construct) and of a set of scrolling commands to be used in those pages (attributes of SCROLLERPAGE construct).

7. Model for the design, verification, and implementation of World Wide Web sites according to claim 1, further characterized by the fact the aforementioned direct page includes the mention of a reference relationship or component for moving from the page of an object to the page of another, unique object, connected to the former page by means of the aforementioned relationship (DIRECTPAGE construct).

8. Model for the design, verification, and implementation of World Wide Web sites according to claim 1, further characterized by the fact that the navigation sub-model enables the definition of different logical hypertexts, constituted by sets of logical pages interconnected (LINK construct), starting from the same conceptual data schema.

9. Model for the design, verification, and implementation of World Wide Web sites according to claim 1, further characterized by the fact that physical pages include the mention of the logical pages which make up the physical pages (PHPAGE construct which contains a PAGE construct) as many times as there are logical pages that constitute the physical pages.

10. Model for the design, verification, and implementation of World Wide Web sites according to claim 9, further characterized by the fact that different sets of physical pages can be defined from the same structural schema and logical hypertext.

11. Model for the design, verification, and implementation of World Wide Web sites according to claim 10, further characterized by the fact that a specific set of physical pages can be defined as a site view (SITEVIEW construct) associated to one or more groups of users.

12. Method for the design, verification, and implementation of World Wide Web sites, said method comprising the steps of:

(a) conducting a requirement analysis of a Web application;
(b) designing the Web site using a model comprising an independent structural sub-model, wherein the structural sub-model contains target, entity, attribute, component and relationship structural elements which make it typed, a composition sub-model, wherein the composition sub-model provides for defining six kinds of logical pages using the structural elements of the structural sub-model, where the first kind is a data page, the second kind is a multidata page, the third kind is an index page, the fourth kind is a filter page, the fifth kind is a scroller page, and the sixth kind is a direct page, and a navigation sub-model, wherein the navigation sub-model provides for connecting the logical pages of the composition sub-model by means of links to form a logical hypertext and to cluster said logical pages within physical pages;
(c) designing and verifying at least one hypertext composed of the logical pages interconnected by links and aggregated into physical pages;
(d) assigning the hypertext to at least one user group;
(e) defining a graphical presentation of the physical pages;
(f) defining a database that supports the Web site; and
(g) generating and installing page templates.

13. Method according to claim 12, including a standard sub-method for the construction of a logical hypertext and of a set of physical pages starting from a conceptual data schema.

14. Method according to claim 12, including rules for the verification of a logical hypertext with respect to a structural data model.

15. Method according to the claim 12, including rules for the verification of a set of physical pages with respect to both the structural model and the logical hypertext.

* * * * *